US011593122B2

(12) United States Patent
Vetter et al.

(10) Patent No.: US 11,593,122 B2
(45) Date of Patent: Feb. 28, 2023

(54) DYNAMIC RESIZING OF A PORTION OF A VIRTUAL DEVICE USER INTERFACE

(71) Applicant: HYPORI LLC, Reston, VA (US)

(72) Inventors: Brian J. Vetter, Austin, TX (US); Mohammad Salman Dhedhi, Round Rock, TX (US)

(73) Assignee: HYPORI LLC, Reston, VA (US)

( * ) Notice: Subject to any disclaimer, the term of this patent is extended or adjusted under 35 U.S.C. 154(b) by 99 days.

(21) Appl. No.: 17/125,891

(22) Filed: Dec. 17, 2020

(65) Prior Publication Data

US 2021/0232409 A1 Jul. 29, 2021

Related U.S. Application Data

(60) Provisional application No. 62/965,072, filed on Jan. 23, 2020.

(51) Int. Cl.

*G06F 9/4401* (2018.01)
*G09G 5/391* (2006.01)

(52) U.S. Cl.

CPC .......... *G06F 9/4411* (2013.01); *G09G 5/391* (2013.01); *G09G 2340/0407* (2013.01)

(58) Field of Classification Search

CPC ........................................ G09G 5/391

See application file for complete search history.

(56) References Cited

U.S. PATENT DOCUMENTS

| | | | | |
|---|---|---|---|---|
| 9,619,673 | B1 | 4/2017 | Vetter et al. | |
| 9,697,629 | B1 | 7/2017 | Vetter et al. | |
| 10,503,458 | B2 | 12/2019 | Lee et al. | |
| 2011/0225542 | A1* | 9/2011 | Schmieder | G06F 3/1454 715/807 |
| 2019/0012769 | A1 | 1/2019 | Arrieta | |

* cited by examiner

*Primary Examiner* — Gustavo Polo

(74) *Attorney, Agent, or Firm* — Pillsbury Winthrop Shaw Pittman LLP

(57) ABSTRACT

In certain embodiments, a change to a display resolution (or other display configuration) to be used at a physical device may be effectuated without the need to reboot a virtual device associated with the physical device. In some embodiments, a display resolution for a portion of a virtual device user interface of a virtual device is determined based on display configuration information corresponding to a first physical device (e.g., a display resolution of the first physical device). The portion of the virtual device user interface is configured based on the determined display resolution, and the configured portion is sent to the first physical device. In some embodiments, in response to obtaining second display configuration information from a second physical device, the portion of the virtual device user interface is resized (e.g., without rebooting the virtual device), and the resized portion is sent to the second physical device.

18 Claims, 15 Drawing Sheets

DYNAMIC RESIZING OF A PORTION OF A VIRTUAL DEVICE USER INTERFACE

CROSS-REFERENCE TO RELATED APPLICATIONS

This application claims the benefit of U.S. Provisional Application No. 62/965,072, entitled "Dynamic Resizing of a Portion of a Virtual Device User Interface," filed on Jan. 23, 2020, which is hereby incorporated by reference herein in its entirety.

FIELD OF THE INVENTION

The invention relates to facilitating dynamic resizing of a portion of a user interface of a virtual device based on display configuration information associated with a physical client device (e.g., without rebooting the virtual device).

BACKGROUND OF THE INVENTION

When different physical devices connect to a virtual device, the information/content within the user interface of the virtual device that is rendered via a display of the physical device may appear squished or stretched. Although there have been attempts to solve this problem by generating a predefined list of display configurations and selecting the best available display configuration from the predefined list of display configurations that closely matches the display configuration of the physical device, such attempts have fallen short because most of the times the predefined list of display configurations does not include an exact match corresponding to the display configuration of the physical device. Additionally, in response to a selection of a display configuration from the predefined list of display configurations, the virtual device needs to be rebooted in order to reflect the selected display configuration. These and other drawbacks exist.

SUMMARY OF THE INVENTION

Aspects of the invention relate to methods, apparatuses, and/or systems for facilitating dynamic resizing of a portion of a user interface of a virtual device based on display configuration information associated with a physical client device (e.g., without rebooting the virtual device).

In some embodiments, display configuration information associated with a physical device may be obtained, and a display resolution may be determined for a portion of a virtual device user interface of a virtual device based on the display configuration information. The portion of the virtual device user interface may be configured based on the determined display resolution of the portion of the virtual device user interface. Subsequent to the configuration, the portion of the virtual device user interface may be sent to the physical device (e.g., without sending one or more other portions of the virtual device user interface) such that the physical device presents the portion of the virtual device user interface. In some embodiments, the portion of the virtual device user interface may be resized based on the display configuration information, and the resized portion of the virtual device user interface may be streamed to the physical device (e.g., without streaming one or more other portions of the virtual device user interface). In this way, for example, the display configuration can be "hot swappable" by enabling the display configuration of the physical device to be changed without the need to reboot the virtual device, thereby decreasing the use of computational resources to effect any display configuration change (e.g., by removing the need to use such computational resources to reboot the virtual device). In addition, the foregoing enables a significant increase in the speed at which a user is able to experience any display configuration change, thereby improving the user experience with such virtual device implementations.

Various other aspects, features, and advantages of the invention will be apparent through the detailed description of the invention and the drawings attached hereto. It is also to be understood that both the foregoing general description and the following detailed description are examples and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise.

DETAILED DESCRIPTION OF THE INVENTION

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
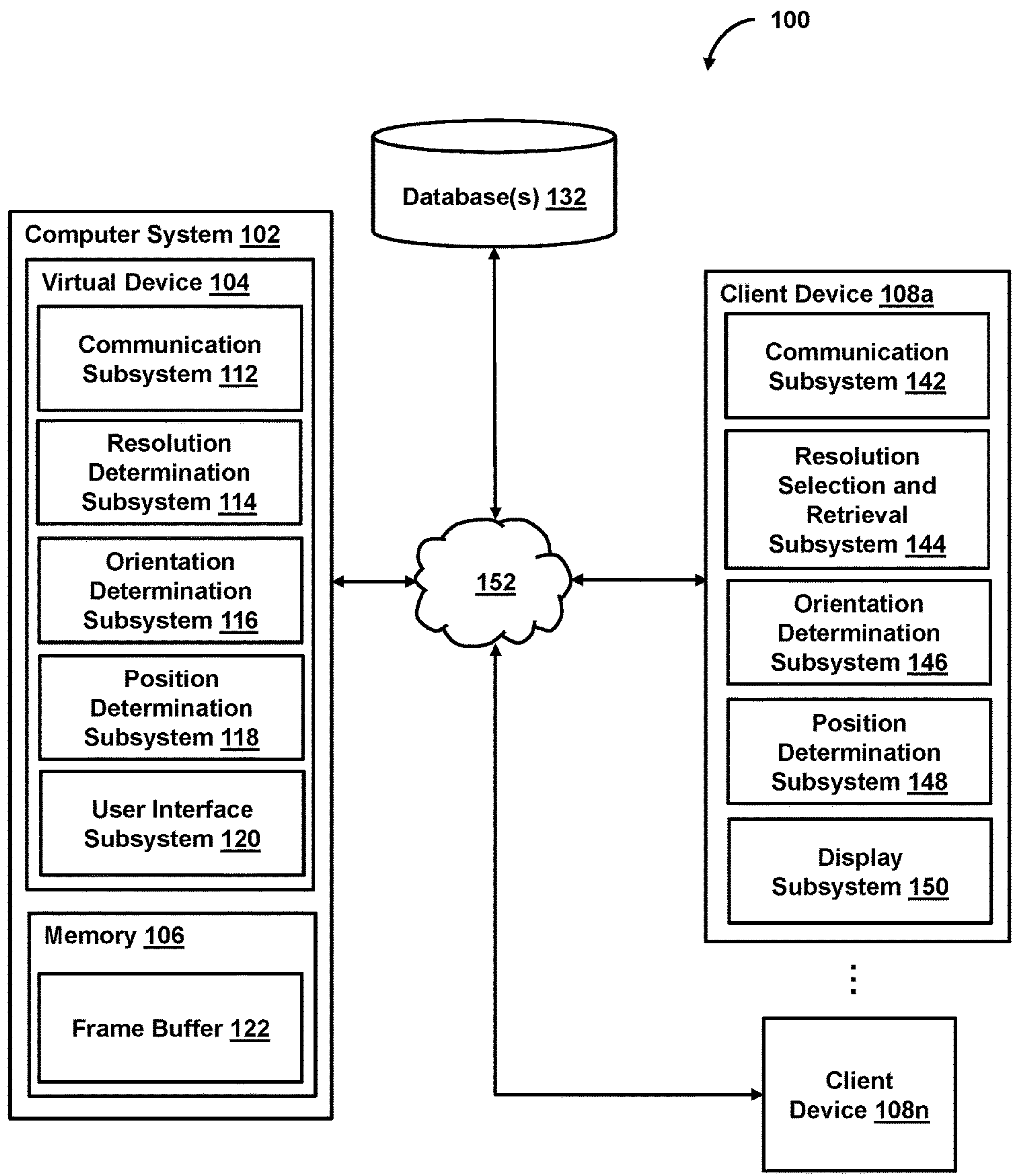
FIG. 1 shows a system for facilitating dynamic resizing of a portion of a virtual device user interface based on display configuration information associated with a physical client device, in accordance with one or more embodiments.

FIG. 1 shows a system 100 for facilitating dynamic resizing of a portion of a virtual device user interface based on display configuration information associated with a physical client device, in accordance with one or more embodiments. As shown in FIG. 1, system 100 may include computer system 102 (e.g., a server, virtual device platform), client device 108 (or client devices 108*a*-108*n*), database 132, or other components. Computer system 102 may include virtual device 104 (or a plurality of virtual devices 104) including communication subsystem 112, resolution determination subsystem 114, orientation determination subsystem 116, position determination subsystem 118, user interface subsystem 120, memory 106 (including frame buffer 122), or other components. Client device 108 (also referred to as a physical device or a physical client device) may include communication subsystem 142, resolution selection and retrieval subsystem 144, orientation determination subsystem 146, position determination subsystem 148, display subsystem 150, or other components. Each client device 108 may include any type of mobile terminal, fixed terminal, or other device. By way of example, client device 108 may include a desktop computer, a notebook computer, a tablet computer, a smartphone, a wearable device, or other physical client device. In some embodiments, a virtual device 104 may be a remote execution environment for the services and applications that make up a device. Each virtual device 104 may thus be a remote execution environment for the services and applications that make up a client device 108 and thus a virtual device 104 may function similarly to a physical client device 108 except that the operating system, data and applications reside and run on a computer system 102 (e.g., a server or a virtual device platform). Virtual devices 104 may thus include virtual applications, such as browsers, emails, games, productivity applications or other applications that execute in the computer system 102. In one embodiment, computer system 102 (e.g., virtual device 104) may be configured as an Android application environment. In some embodiments, virtual devices 104 hosting Android (or Security Enhancements for Android (SEAndroid)) may be created for each user using Linux's Kernel-based Virtual Machine (KVM) and Quick EMUlator (QEMU). In some embodiments, a client device 108 may be associated with one virtual device 104 or a plurality of virtual devices 104. In some embodiments, a virtual device 104 may be associated with one client device 108 or a plurality of client devices 108.

Users may, for instance, utilize one or more client devices 108 to interact with one another, one or more computer systems 102, or other components of system 100. It should be noted that, while one or more operations are described herein as being performed by components of computer system 102, those operations may, in some embodiments, be performed by components of client device 108 or other components of system 100 and while one or more operations are described herein as being performed by components of client device 108, those operations may, in some embodiments, be performed by components of computer system 102 or other components of system 100. In the present disclosure, a user interface associated with a virtual device 104 (e.g., a user interface associated with a virtual operating system running on (or hosted by) the virtual device 104 or of a virtual application running on (or hosted by) the virtual device 104) may be referred to as a virtual device user interface (UI), and a user interface associated with a client device 108 (e.g., a user interface associated with an operating system running on (or hosted by) the client device 108 or of a client application running on (or hosted by) the client device 108) may be referred to as a client device user interface (UI).

In some embodiments, client applications running on (or hosted by) the client device 108 may be accessed via a client device UI. In some embodiments, a client application (or a plurality of client applications) may be associated with a virtual device 104. Such a client application may be accessed via a client device UI and may render (e.g., via display subsystem 150) a virtual device UI via a display of the client device 108. For example, a virtual device UI (or a portion of the virtual device UI) may be accessed and displayed via a client application running on (or hosted by) the client device 108. In some embodiments, the client applications may correspond to an email application, browser application, or any other application supported by a physical client device 108 (e.g., a mobile device, a tablet, or a desktop computer).

In some embodiments, in response to a selection of a client application associated with the virtual device 104 (e.g., via a client device UI displayed via a display of the client device 108), the client device 108 may communicate with the virtual device 104 to obtain a virtual device UI and the display subsystem 150 may display the virtual device UI via a display of the client device 108. For example, a selection of a client application associated with the virtual device 104 allows virtual device UI to be accessed via a display of the client device 108. The virtual device UI may include a plurality of information/content (e.g., icons) relating to applications (e.g., virtual applications) that run on (or are hosted by) the virtual device 104. The virtual applications may correspond to an email application, browser application, word application, excel application, or any other application supported by, for example, a physical client device 108. Since the virtual applications are accessible via the client device 108 and are hosted by the virtual device 104, the data associated with the virtual applications may be stored in the virtual device 104 (or computer system 102). For example, memory 106 or database 132 (or another database (not shown) within the computer system 102 or virtual device 104) may store the data associated with the virtual applications. Although database 132 is illustrated as being separate from the computer system 102 and virtual device 104 in FIG. 1, it should be understood that database 132 may be included within the computer system 102 or virtual device 104. The data associated with the virtual applications may include data associated with emails, documents, or other confidential information. Since data (e.g., confidential information) may be stored outside of the client device 108, malicious actors may not be able to gain access to such data simply by gaining access to the client device 108.

In some embodiments, one or more virtual applications may be accessed via a client application hosted on the client device 108. For example, a virtual application may be accessed via a virtual device UI displayed via a display screen of the client device 108. The user interface subsystem 120 of the virtual device 104 may generate (or retrieve) a virtual device UI (or a portion of the virtual device UI) and the communication subsystem 112 of the virtual device 104 may send information associated with the virtual device UI to the client device 108 (e.g., communication subsystem 142 of the client device 108 may obtain the information associated with the virtual device UI). The user interface subsystem 120 may send information associated with the virtual device UI in response to a selection of a client application associated with the virtual device 104, in response to a communication from the client device 108 indicating the selection (via the client device 108) of the client application associated with the virtual device 104, or in response to a connection between the client device 108 and virtual device 104. The information associated with the virtual device UI may include an image of the virtual device UI or a video (e.g., a stream of h264 encoded video) associated with the virtual device UI.

The information associated the virtual device UI may be sent to the client device 108 in response to a request from the client device 108 or in response to a connection between the client device 108 and the virtual device 104. For example, in response to a user selection of a client application running or hosted on the client device 108, the client application may send an application programming interface (API) request to the computer system 102 in order to obtain the information associated with the virtual device UI. The client application may recognize the identity of a user accessing the client application on the client device 108 and the client device 108 (via the client application) may send a request for a virtual device UI associated with the identified user. Alternatively, the client application may request a user to enter his/her user credentials (e.g., a username and password combination, biometrics, etc.) and in response to proper identification, the client application may render the virtual device UI specific to the user via a display screen of the client device 108. Different users or client devices 108 may be associated with different virtual device UIs. Accordingly, the client application may connect to one or more virtual devices 104 and may render a plurality of virtual device UIs based on, for example, identification of users associated with the client device 108 or identification of the client device 108.

However, the content/information of the virtual device UI that is rendered/displayed via the client device 108 may appear squished or stretched. For example, since client devices 108 come in many different sizes and screen configurations, the content/information of the virtual device UI that is displayed via the display screen of the client device 108 may appear to be squished or stretched. In one use case, when a client device 108 connects to a virtual device 104, the virtual device 104 may not know the display (or screen) configuration(s) of the client device 108 and therefore, the information/content of the virtual device UI that is transmitted to the client device108 may appear stretched or squished when being displayed via a display screen of the client device 108.

U.S. Pat. No. 9,697,629 (which is incorporated herein by reference) attempted to solve this problem by generating a predefined list of display configurations such that when a client device connected to a virtual device, the virtual device would try and select the best available display configuration from the predefined list of display configurations that closely matched the display configuration of the client device. However, despite generating a predefined list of display configurations and selecting the best available display configuration from the predefined list of display configurations that closely matched the display configuration of the client device, the information/content of the virtual device UI continued to appear squished or stretched when displayed via different screens of different client devices. Specifically, when the predefined list of display configurations did not include an exact match corresponding to the display configuration of the client device, the information/content of the virtual device UI appeared squished or stretched when being displayed via a display screen of such client device 108. In addition, when a best available display configuration was selected from the predefined list of display configurations that closely matched the display configuration of the client device, the virtual device needed to be rebooted in order to reflect the selected display configuration. Rebooting of the virtual device can be time consuming, thereby delaying the transmission of the virtual device UI to a client device and delaying the display of such virtual device UI via a display screen of the client device. Additionally, rebooting the virtual device can also result in the additional usages of memory and computational resources associated with the virtual device.

In order to overcome one or more of the above-noted problems, the present disclosure describes a system 100 that facilitates configuring a portion of a virtual device UI (or reconfiguring a display resolution of the portion of the virtual device UI or reconfiguring the portion of the virtual device UI) based on display configuration information associated with the client device and presenting the portion of the virtual device UI (e.g., an interactive display of a virtual operating system running on (or hosted by) a virtual device or of a virtual application running on (or hosted by) the virtual device) via a display screen of the client device (e.g., without rebooting the virtual device). The virtual device 104 may be programmed such that a configuration (e.g., display resolution, pixel dimension, dimension, aspect ratio, pixel density, or area) of the virtual device UI is set, for example, to be larger than a configuration (e.g., display resolution, pixel dimension, dimension, aspect ratio, pixel density, or area) of the largest available client device 108. The configuration (e.g., display resolution, pixel dimension, dimension, aspect ratio, pixel density, or area) of the portion of the virtual device UI is smaller than the configuration (e.g., display resolution, pixel dimension, dimension, aspect ratio, pixel density, or area) of the virtual device UI. In FIGS. 2B, 4B, 5B, and 6B, client device 108*a* is illustrated as a smartphone device and in FIG. 3B, client device 108*b* is illustrated as a tablet device. It should be understood that such illustration is simply to illustrate the different client devices 108 to help explain the details of the present disclosure and that client device 108*a* can be any other client device other than a smartphone device and that client device108*b* can be any other client device other than a tablet device.

In some embodiments, prior to establishing normal communication between a client device 108*a* and computer system 102 (e.g., virtual device 104), the client device 108*a* and the virtual device 104 may perform a handshake, during which information may be exchanged between the client device 108*a* and the computer system 102. The exchanged information may establish the protocols of a communication link at the start of the communication between the client device 108*a* and the computer system 102 and prior to establishing normal communication between the client device 108*a* and computer system 102. Handshaking can negotiate parameters that are acceptable to equipment and systems at both ends of the communication channel (e.g., at both the client device 108*a* and the computer system 102), including information transfer rate, coding alphabet, parity, interrupt procedure, and other protocol or hardware features. In some embodiments, the handshaking process may also include exchange of display configuration information. For example, during the handshaking process, the client device 108*a* (e.g., resolution selection and retrieval subsystem 144) may retrieve (e.g., from a memory of the client device 108*a*) display configuration information associated with the client device and the computer system 102 (e.g., communication subsystem 112) may obtain such display configuration from the client device 108*a* (e.g., communication subsystem 142) information via a network connection (e.g., network 152). Alternatively, the display configuration information may be retrieved (e.g., from a memory of the client device 108) by the client device 108*a* (e.g., resolution selection and retrieval subsystem 144) after the handshaking process, and the computer system 102 (e.g., communication subsystem 112) may obtain such display configuration information from the client device 108*a* (e.g., communication subsystem 142) via a network connection (e.g., network 152).

In some embodiments, the display configuration information associated with the client device 108*a* may include a resolution (or display resolution or pixel dimensions) of a display of the client device 108*a,* dimensions (or physical dimensions) of a display of the client device 108*a,* aspect ratio of a display of the client device 108*a,* pixel density (pixels per inch (PPI) or pixels per centimeter (PPCM or pixels/cm)) of a display of the client device 108*a,* area of a display of the client device 108*a,* or one or more of the foregoing with respect to a client application of the client device 108*a* (e.g., the client application associated with the virtual device 108). The resolution of the display of the client device 108*a* may correspond to a number of distinct pixels in each dimension that can be displayed via the display of the client device 108*a*. For example, a resolution of 1024×768 means that the width is 1024 pixels and the height (or length) is 768 pixels. The dimensions of a display of the client device 108*a* may include height (or length), width, or diagonal length measurements of the display in inches or centimeters (or any other unit of measurement of height (or length), width, or diagonal length). The aspect ratio of a display of the client device 108*a* corresponds to a proportional relationship between a width and height (or length) of the display of the client device. The aspect ratio may be expressed as two numbers separated by a colon (e.g., 16:9). Pixel density may be expressed as pixels per inch (PPI) or pixels per centimeter (PPCM or pixels/cm) and PPI or PPCM corresponds to the size of a display in inches or centimeters and the total number of pixels in the horizontal and vertical directions. The pixel density may also be referred to as dots per inch (DPI). The area of a display may be represented as square inches or square centimeters (or any other units of measurement).

Figure 2A:
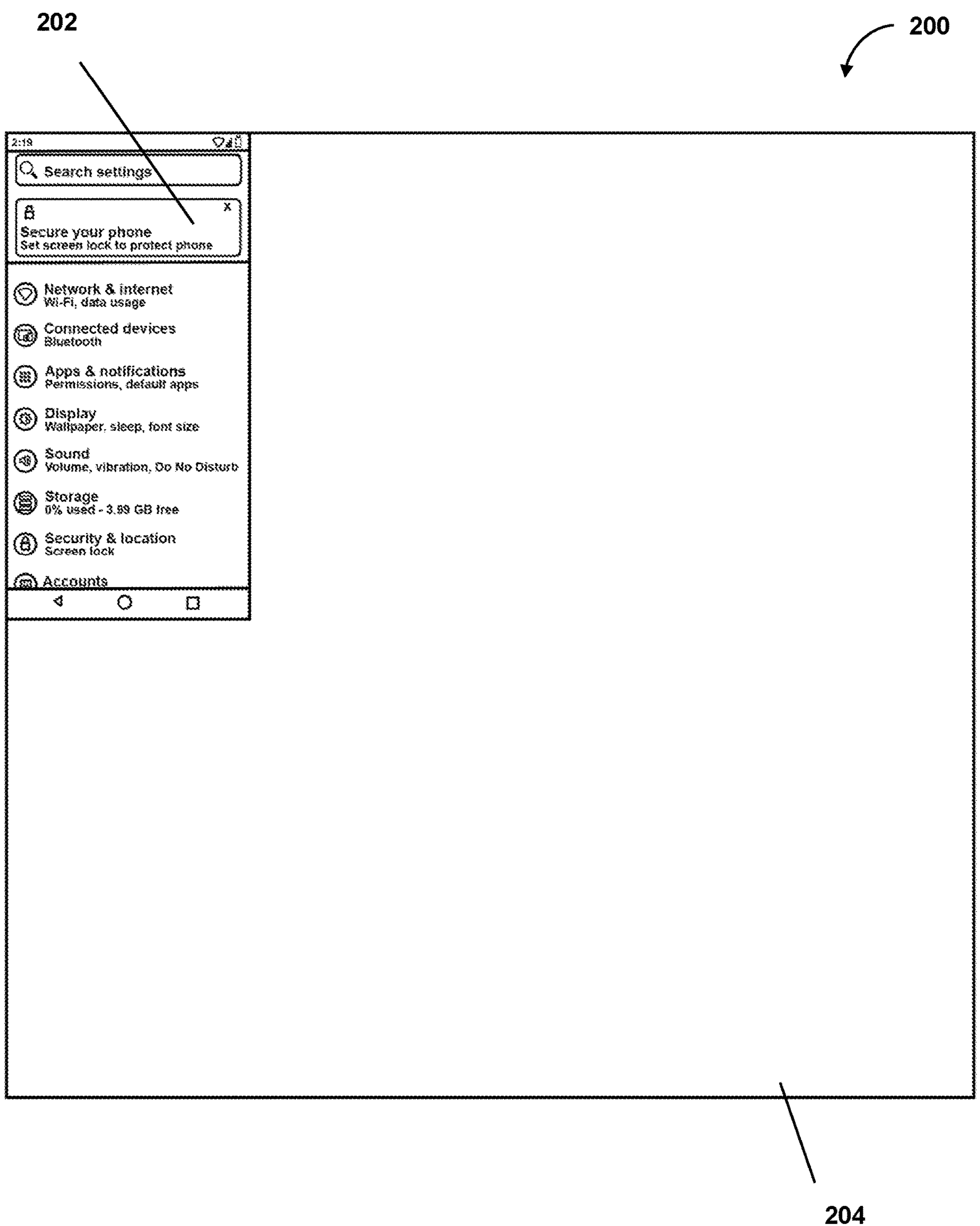
FIG. 2A shows a virtual device user interface, in accordance with one or more embodiments.

As illustrated in FIG. 2A, the virtual device UI 200 includes a first portion 202 and a second portion 204. In some embodiments, the second portion 204 may correspond to the entire virtual device UI 200 and the first portion 202 may correspond to a portion that is overlaid on top of the second portion 204. The second portion 204 of the virtual device UI (which spans the entire virtual device UI 200) may be programmed to be a fixed size or resolution, although the second portion 204 (or the entire virtual device UI) may be reprogrammed to be a different size or resolution. The second portion 204 (or the entire virtual device UI) also may be programmed to have a fixed pixel density, although the second portion 204 (or the entire virtual device UI) may be reprogrammed to include a different pixel density. In some embodiments, the computer system 102 (e.g., resolution determination subsystem 114) may determine a configuration (e.g., display resolution, pixel dimension, dimension, aspect ratio, pixel density, or area) of the first portion 202 of a virtual device UI 200 based on the obtained display configuration information from the client device 108*a*.

Although the second portion 204 may be programmed (or preconfigured) to a specific fixed configuration (e.g., display resolution, pixel dimension, dimension, aspect ratio, pixel density, or area) and may be generated prior to any connection with a client device 108*a,* the first portion 202 may be generated based on a connection between the client device 108*a* and a virtual device 104 and may be configured or reconfigured (e.g., resized or reshaped) based on display configuration information associated with the client device 108*a*. As noted above, a client application associated with a virtual device 104 may be accessed via a client device UI running on (or hosted by) the client device 108*a*. In response to accessing such a client application, a connection between the virtual device 104 and the client device 108*a* may be established and the computer system 102 (e.g.., user interface subsystem 120) may generate the first portion 202 of the virtual device UI corresponding to such a client application associated with the virtual device 104. The first portion 202 of the virtual device UI may include a plurality of information/content (e.g., icons) relating to applications (e.g., virtual applications) that run on (or are hosted by) the virtual device 104. The virtual applications may correspond to an email application, browser application, word application, excel application, or any other application supported by, for example, a physical client device 108*a,* and such virtual application may be accessed via the client device 108*a*. In response to a selection of a virtual application via client device 108*a,* the computer system 102 (e.g.., user interface subsystem 120) may generate the first portion 202 of the virtual device UI such that the information/content within the first portion 202 corresponds to such a virtual application. The content/information within the first portion 202 of the virtual device UI may be changed in response to user interaction via the client device 108*a* that renders/display the virtual device UI via its display screen.

In some embodiments, the computer system 102 (e.g., resolution determination subsystem 114) may determine one or more configuration (e.g., display resolution, pixel dimension, dimension, aspect ratio, pixel density, or area) of the first portion 202 of the virtual device UI 200 based on the obtained display configuration information from the client device 108*a*. Determining the configurations of the first portion 202 of the virtual device UI 200 may include determining a plurality of configurations (e.g., a plurality of resolutions, pixel dimensions, or pixel density) for the first portion 202 of the virtual device UI 200. The plurality of configurations may correspond to a low resolution (and a low pixel density), a medium resolution (and a medium pixel density), and a high resolution (and a high pixel density) for the first portion 202 of the virtual device UI 200. Although three configurations for the first portion 202 are described herein, it should be understood that any number of different configurations may be determined based on the obtained display configuration information corresponding to the client device 108*a*. A listing of the plurality of configurations may be sent to the client device 108*a* to allow the client device 108*a* (or a user of the client device 108*a*) to select one or more of the plurality of configurations. In response to a selection of one or more of the plurality of configurations, the computer system 102 (e.g., resolution determination subsystem 114) may determine one or more configurations (e.g., display resolution, pixel dimension, dimension, aspect ratio, pixel density, or area) of the first portion 202 of the virtual device UI 200 to correspond to the selected configurations. Accordingly, the computer system 102 (e.g., resolution determination subsystem 114) may determine one or more configurations (e.g., display resolution, pixel dimension, dimension, aspect ratio, pixel density, or area) of the first portion 202 of the virtual device UI 200 based on the obtained display configuration information from the client device 108*a* and based on the obtained selection of configurations from the client device 108*a*. Alternatively, one or more of the plurality of configurations may be automatically selected by the computer system 102 or the client device 108*a* (e.g., such that the first portion 202 is reconfigured based on the determined configuration(s) without the computer system 102 or the client device 108*a* receiving a user input specifying the determined configuration(s) subsequent to the computer system 102 obtaining the display configuration information from client device 108*a*).

In some embodiments, determining the configurations of the first portion 202 of the virtual device UI 200 may include determining a plurality of configurations (e.g., a plurality of resolutions, pixel dimensions, or pixel density) for the first portion 202 of the virtual device UI 200 and selecting one or more of the plurality of configurations based on network bandwidth, network traffic, or bandwidth usage. Specifically, the computer system 102 (or the client device 108*a*) may monitor the network bandwidth, network traffic, or bandwidth usage (e.g., bandwidth or traffic associated with network 152) and obtain information associated with the network bandwidth, network traffic, or bandwidth usage. Based on the information associated with the network bandwidth, network traffic, or bandwidth usage, the computer system 102 (or the client device 108*a*) may select one or more of the plurality of configurations. For example, the computer system 102 may select a configuration corresponding to (i) a high resolution (and a high pixel density) for the first portion 202 of the virtual device UI 200 in response to a high network bandwidth (or low network traffic, or low bandwidth usage), (ii) a low resolution (and low pixel density) for the first portion 202 of the virtual device UI 200 in response to a low network bandwidth (or high network traffic or high bandwidth usage), or (iii) a medium resolution (and medium pixel density) for the first portion 202 of the virtual device UI 200 in response to a medium network bandwidth (or medium network traffic or medium bandwidth usage). The computer system 102 may determine a number of bits (e.g., a number of bits that need to be transmitted) for each of the different configurations and, based on the number of bits for each of the configurations and based on the monitored network bandwidth (or network traffic or bandwidth usage), the computer system 102 may select one or more of the plurality of configurations for the first portion 202 of the virtual device UI 200. Accordingly, the computer system 102 (e.g., resolution determination subsystem 114) may determine one or more configurations (e.g., display resolution, pixel dimension, dimension, aspect ratio, pixel density, or area) of the first portion 202 of the virtual device UI 200 based on the obtained display configuration information from the client device 108*a* and based on the selection of configurations (e.g., selection being based on the on the number of bits for each of the configurations and based on the monitored network bandwidth (or network traffic or bandwidth usage)).

In some embodiments, the first portion 202 may be configured based on the determined configurations (e.g., display resolution, pixel dimension, dimension, aspect ratio, pixel density, or area). As an example, the first portion 202 may be configured based on a selected one of the plurality of configurations.

Figure 2B:
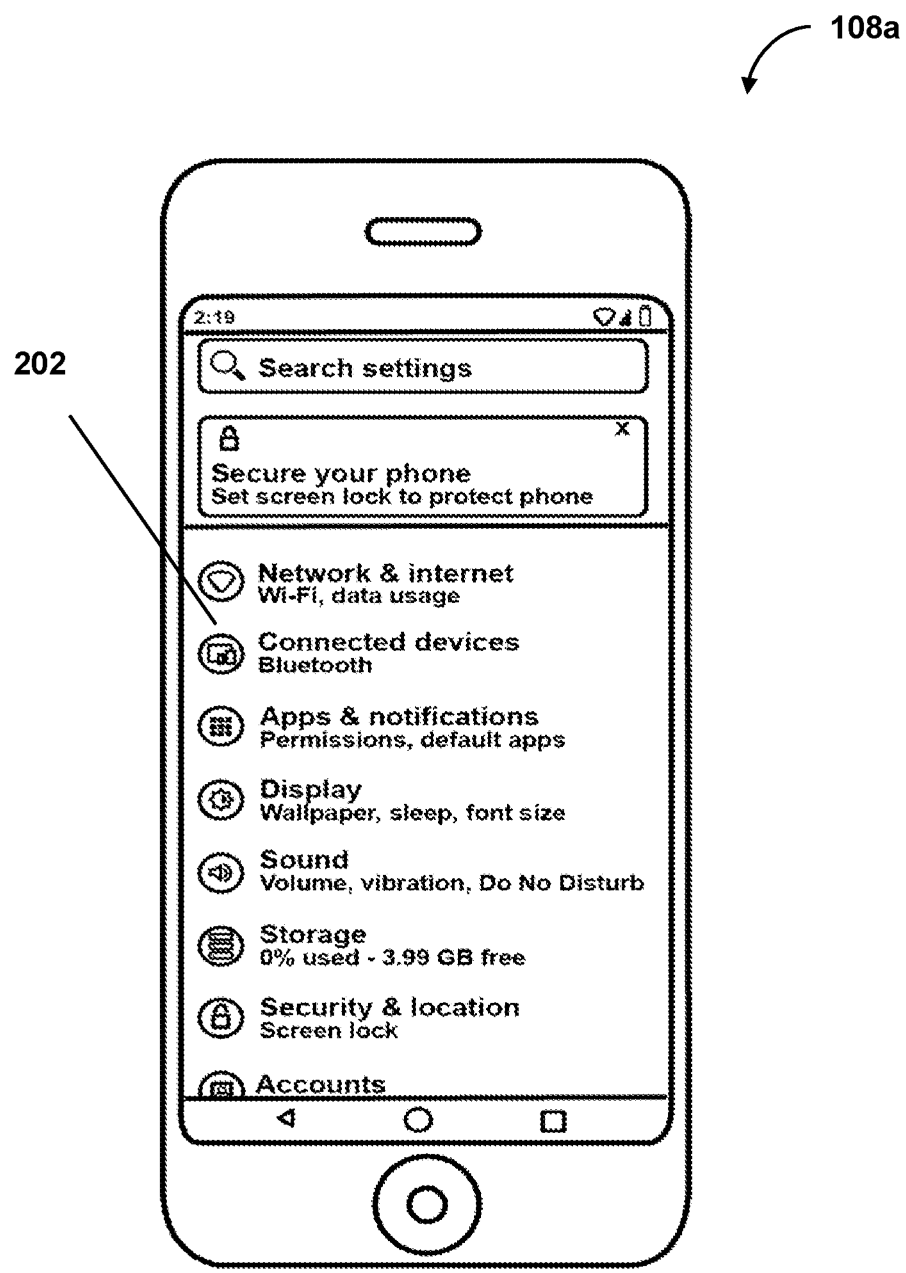
FIG. 2B shows a client device displaying a portion of the virtual device user interface, in accordance with one or more embodiments.

The computer system 102 (e.g., communication subsystem 112) may prepare and send (e.g., stream) the first portion 202 (which has been configured) of the virtual device UI 200 to the client device 108*a* (see FIG. 2B). In some embodiments, the first portion 202 may be sent to the client device 108*a* without sending the second portion 204 (or without sending other portions of the virtual device UI 200 other than the first portion 202) to the client device 108*a*. In response to obtaining the first portion 202 of the virtual device UI 200, the client device 108*a* may present the first portion 202 of the virtual device UI 200 via a display screen of the client device 108*a* (see FIG. 2B). The first portion 202 may be sent as an image or a video (e.g., a stream of h264 encoded video) to the client device 108*a*.

In some embodiments, a frame buffer 122 (as illustrated in memory 106 of the computer system 102 in FIG. 1) may store a bitmap corresponding to the virtual device UI 200 (including the first portion 202 and the second portion 204). The computer system 102 may generate a frame of display data (e.g., a video signal or an image) based on a portion of the bitmap that corresponds to the first portion 202 of the virtual device UI 200, encode the frame of display data, and send the frame of display data to the client device 108*a*. In response to obtaining such frame of display data, the client device 108*a* may present the first portion 202 of the virtual device UI 200 via a display screen of the client device 108*a* (see FIG. 2B). The frame of display data may only correspond to the first portion 202 and not the second portion 204 (or other portions of the virtual device UI 200 other than the first portion 202). For example, the computer system 102 may only encode the first portion 202 of the virtual device UI 200 such that only the first portion 202 of the virtual device UI 200 is sent to the client device 108*a*. In addition, the computer system 102 may only perform macroblock comparison related to the first portion 202 during the encoding process. Generating frames of display data, encoding of frames of display data, and performing macroblock comparisons during the encoding process are described in U.S. Pat. No. 10,503,458, which is incorporated herein by reference.

In some embodiments, the first portion 202 may be reconfigured in response to one or more triggers, such as a switching of a different physical device on which content is to be displayed, a change in display configurations of a client application (on the physical device) connected to the virtual device 104, a switching of a physical device that is to be connected to the virtual device 104, a change in network bandwidth, network traffic, or bandwidth usage, or other triggers. As an example, if the computer system 102 (or client devices 108*a* or 108*b*) detects one or more of the foregoing triggers, one or more operations described herein may be performed to automatically reconfigure the first portion 202 to seamlessly adapt to the situation corresponding to the detected triggers.

In some embodiments, the client device 108*a* (or the client application thereof) that is connected to the virtual device 104 may be changed or switched. For example, a user accessing information/content associated with the virtual device UI 200 via client device 108*a* (see FIG. 2B) may wish to switch to a client device 108*b* (see FIG. 3B) by disconnecting the connection between the client device 108*a* and the virtual device 104 and establishing a new connection between the client device 108*b* and the virtual device 104. In another example, a user accessing information/content associated with the virtual device UI 200 via the client device 108*a* may wish to access the information/content (i) via a different display configuration of the client application of the client device 108*a* (e.g., different pixel dimensions, aspect ratio, pixel density, etc., of the client application) or (ii) via a larger display (e.g., using a Samsung Dex) while continuing to have the client device 108*a* connected to the virtual device 104. Since the display configuration information associated with the client device 108*b* (or with the modified display configuration of the client application or a larger display (where applications are resizable)) will be different from the display configuration information of client device 108*a,* the information/content associated with the virtual device UI 200 may appear squished or stretched when being displayed via the client device 108*b* or a larger display. In order to solve this problem (and other problems noted above), the system 100 changes the configuration (e.g., reconfigures, resizes, or reshapes) of the first portion 202 such that information/content associated with a portion of the virtual device UI 200 is displayed via a display screen of the client device 108*b* (or a larger display) without one or more such issues (e.g., without the information/content appearing to be squished or stretched, without the need for rebooting the virtual device 104, etc.).

Specifically, in some embodiments, in response to the disconnection of the client device 108*a* from the virtual device 104 and a connection of the client device 108*b* to the virtual device 104 (or in response to a connection of a larger display device (e.g., using the Samsung Dex) to the virtual device 104 while the connection between client device 108*a* and virtual device 104 is maintained), the computer system 102 may receive display configuration information of client device 108*b* (or the larger display). The display configuration information of client device 108*b* may include a resolution (or display resolution or pixel dimensions) of a display of the client device 108*b,* dimensions (or physical dimensions) of a display of the client device 108*b,* aspect ratio of a display of the client device 108*b,* pixel density (pixels per inch (PPI) or pixels per centimeter (PPCM or pixels/cm)) of a display of the client device 108*b,* or area of a display of the client device 108*b.* The resolution of the display of the client device 108*b* may correspond to a number of distinct pixels in each dimension that can be displayed via the display of the client device 108*b.* For example, a resolution of 1024×768 means that the width is 1024 pixels and the height (or length) is 768 pixels. The dimensions of a display of the client device 108*b* may include height (or length), width, or diagonal length measurements of the display in inches or centimeters (or any other unit of measurement of height (or length), width, or diagonal length). The aspect ratio of a display of the client device 108*b* corresponds to a proportional relationship between a width and height (or length) of the display of the client device. The aspect ratio may be expressed as two numbers separated by a colon (e.g., 16:9). Pixel density may be expressed as pixels per inch (PPI) or pixels per centimeter (PPCM or pixels/cm) and PPI or PPCM corresponds to the size of a display in inches or centimeters and the total number of pixels in the horizontal and vertical directions. The pixel density may also be referred to as dots per inch (DPI). The area of a display may be represented as square inches or square centimeters (or any other units of measurement).

In some embodiments, in response to obtaining display configuration information corresponding to client device 108*b* (which is different from client device 108*a*), the computer system 102 (e.g., resolution determination subsystem 114) may determine a new configuration (e.g., display resolution, pixel dimension, dimension, aspect ratio, pixel density, or area) of the first portion 202 based on the display configuration information corresponding to client device 108*b* and change the configuration (e.g., resize or reshape) of the first portion 202 of the virtual device UI 200 to generate a reconfigured first portion 302 (see FIG. 3A) of the virtual device UI 200. Although the first portion 202 is reconfigured based on the obtained display configuration information corresponding to client device 108*b,* it should be understood that the second portion 204 is not reconfigured and therefore, the second portion 204 (which spans the entire virtual device UI 200) remains the same despite the change in configuration to the first portion 202. Despite the reconfiguration of the first portion 202, the reconfigured first portion 302 is smaller than the configuration associated with the second portion 204 (or the configuration associated with the entire virtual device UI 200). An advantage of reconfiguring only the first portion 202 (and not the second portion 204 or the entire virtual device UI 200) is that it avoids the need to reboot the virtual device 104, which ultimately saves time and resources (e.g., memory and processing resources).

In some embodiments, in response to one or more display configurations of the client application (e.g., connected to the virtual device 104) being modified (e.g., manually by a user, automatically by the client device 108*a* or 108*b* without the user specifying the modification, etc.), the computer system 102 may receive updated display configuration information of the client application. As an example, on a mobile device or other device with multi-window capability, a user may resize the window of the client application, and the client device 108*a* may send (to the computer system 102) updated display configuration information that includes pixel dimensions, an aspect ratio, or other display characteristic that corresponds to the resized window (e.g., a size of the resized window in pixel width and height (and/or other dimensions), an aspect ratio of the resized window, etc.). In some embodiments, in response to obtaining the updated display configuration information, the computer system 102 may determine a new configuration of the first portion 202 based on the updated display configuration information and change the configuration (e.g., resize or reshape) of the first portion 202 of the virtual device UI 200 to generate a reconfigured first portion 302 (see FIG. 3A) of the virtual device UI 200 (e.g., so that the reconfigured first portion has the same or similar pixel dimensions, aspect ratio, or other display characteristics as the resized window).

In some embodiments, determining the configuration of the portion 302 of the virtual device UI 200 may include determining a plurality of configurations (e.g., a plurality of resolutions, pixel dimensions, or pixel density) for the portion 302 of the virtual device UI 200. The plurality of configurations may correspond to a low resolution (and a low pixel density), a medium resolution (and a medium pixel density), and a high resolution (and a high pixel density) for the portion 302 of the virtual device UI 200. Although three configurations for the portion 302 are described herein, it should be understood that any number of different configurations may be determined based on the obtained display configuration information from the client device 108*b.* A listing of the plurality of configurations may be sent to the client device 108*b* to allow the client device 108*b* (or a user of the client device 108*b*) to select one of the plurality of configurations. In response to a selection of one of the plurality of configurations, the computer system 102 (e.g., resolution determination subsystem 114) may determine a configuration (e.g., display resolution, pixel dimension, dimension, aspect ratio, pixel density, or area) of the portion 302 of the virtual device UI 200 to correspond to the selected one of the plurality of configurations. Accordingly, the computer system 102 (e.g., resolution determination subsystem 114) may determine a configuration (e.g., display resolution, pixel dimension, dimension, aspect ratio, pixel density, or area) of the portion 302 of the virtual device UI 200 based on the obtained display configuration information from the client device 108*b* and based on the obtained selection of configurations from the client device 108*b*. Alternatively, the computer system 102 or client device 108*b* may automatically determine one of the plurality of configurations (e.g., such that the portion 302 is reconfigured based on the determined configuration without the computer system 102 or the client device 108*b* receiving a user input specifying the determined configuration subsequent to the computer system 102 obtaining the display configuration information from client device 108*b*). In some embodiments, determining the configuration of the portion 302 of the virtual device UI 200 may include determining a plurality of configurations (e.g., a plurality of resolutions, pixel dimensions, or pixel density) for the portion 302 of the virtual device UI 200 and selecting one of the plurality of configurations based on network bandwidth or network traffic. In some embodiments, the computer system 102 may monitor the network bandwidth, network traffic, or bandwidth usage (e.g., bandwidth or traffic associated with network 152) and obtain information associated with the network bandwidth, network traffic, or bandwidth usage. Based on the information associated with the network bandwidth, network traffic, or bandwidth usage, the computer system 102 may select one of the plurality of configurations. For example, the computer system 102 may select a configuration corresponding to (i) a high resolution (and a high pixel density) for the portion 302 of the virtual device UI 200 in response to a high network bandwidth (or low network traffic or low bandwidth usage), (ii) a low resolution (and low pixel density) for the portion 302 of the virtual device UI 200 in response to a low network bandwidth (or high network traffic or high bandwidth usage), or (iii) a medium resolution (and medium pixel density) for the portion 302 of the virtual device UI 200 in response to a medium network bandwidth (or medium network traffic or medium bandwidth usage). The computer system 102 may determine a number of bits for each of the different configurations and based on the number of bits for each of the configurations and based on the monitored network bandwidth, network traffic, or bandwidth usage, the computer system 102 may select one of the plurality of configurations for the portion 302 of the virtual device UI 200. Accordingly, the computer system 102 (e.g., resolution determination subsystem 114) may determine a configuration (e.g., display resolution, pixel dimension, dimension, aspect ratio, pixel density, or area) of the portion 302 of the virtual device UI 200 based on the obtained display configuration information from the client device 108*b* and based on the selection of configurations (e.g., selection being based on the on the number of bits for each of the configurations and based on the monitored network bandwidth, network traffic, or bandwidth usage).

In some embodiments, the first portion 202 may be reconfigured based on the determined configuration (e.g., display resolution, pixel dimension, dimension, aspect ratio, pixel density, or area) for the portion 302. As an example, the first portion 202 may be reconfigured based on a selected one of the plurality of configurations so as to generate a reconfigured portion 302 of the virtual device UI 200. In one use case, if the client device 108*a* (or other component of system 100) detects a consistently slower network connection, it can start a negotiation for a lower resolution from a list of offered screen resolutions (e.g., to lower the required bit count). Additionally, or alternatively, the client device 108*a* (or other component of system 100) can renegotiate a higher resolution when the network conditions improve. As discussed herein, the foregoing may be performed automatically without user confirmation or input (e.g., specifying the lower or higher resolution) or in response to a user confirmation or selection to effectuate the adjustment (e.g., prompting a user to accept the adjustment).

For illustrative purposes, the present disclosure presents an example of obtained display configuration information corresponding to a Samsung Galaxy Tablet 2 and determining a plurality of configurations corresponding to the portion 302 based on the obtained display configuration information. For example, the obtained display configuration information may include a display resolution (or pixel dimension) of 1536×2048 (e.g., width×height) and a pixel density of 320 corresponding to the Samsung Galaxy Tablet 2. Based on this display configuration information, the computer system 102 (e.g., resolution determination subsystem 114) may determine a plurality of configurations for the portion 302. Specifically, since the width to height ratio (1536/2048) for the Samsung Galaxy Tablet 2 is 0.75, the computer system 102 (e.g., resolution determination subsystem 114) may determine a plurality of configurations that correspond to this ratio or that are very close to this ratio. For instance, the determined plurality of configurations may include: (i) 1152×1536 (and pixel density of 240), (ii) 1056×1408 (and pixel density of 216), and (iii) 768×1024 (and pixel density of 160). Each of these configurations has a width to height ratio of 0.75. Further, the computer system 102 may utilize the pixel density of 320 of the Samsung Galaxy Tablet 2 to determine the pixel density for each of these configurations. For example, the display resolution (or pixel dimension) of 1536×2048 (e.g., width×height) and a pixel density of 320 indicates that the width of this tablet is 4.8 inches (1536/320) and the height of this tablet is 6.4 inches (2048/320). Accordingly, the computer system 102 may determine (i) a pixel density of 240 for a display resolution (or pixel dimension) of 1152×1536 (because this corresponds to a width of 4.8 inches (1152/240) and height of 6.4 includes (1536/240)), (ii) a pixel density of 216 for a display resolution (or pixel dimension) of 1056×1408 (because this corresponds to a width of 4.89 inches (1056/216) and a height of 6.51 inches (1408/216)), and (iii) a pixel density of 160 for a display resolution (or pixel dimension) of 768×1024 (because this corresponds to a width of 4.8 inches (768/160) and a height of 6.4 inches (1024/160)). One of the plurality of configurations may be selected (e.g., by a client device 108, by a user of a client device 108, or based on network bandwidth, network traffic, or bandwidth usage, etc.) to reconfigure the first portion 202 and, based on such selection, the first portion 202 may be reconfigured to generate a reconfigured portion 302.

Figure 3A:
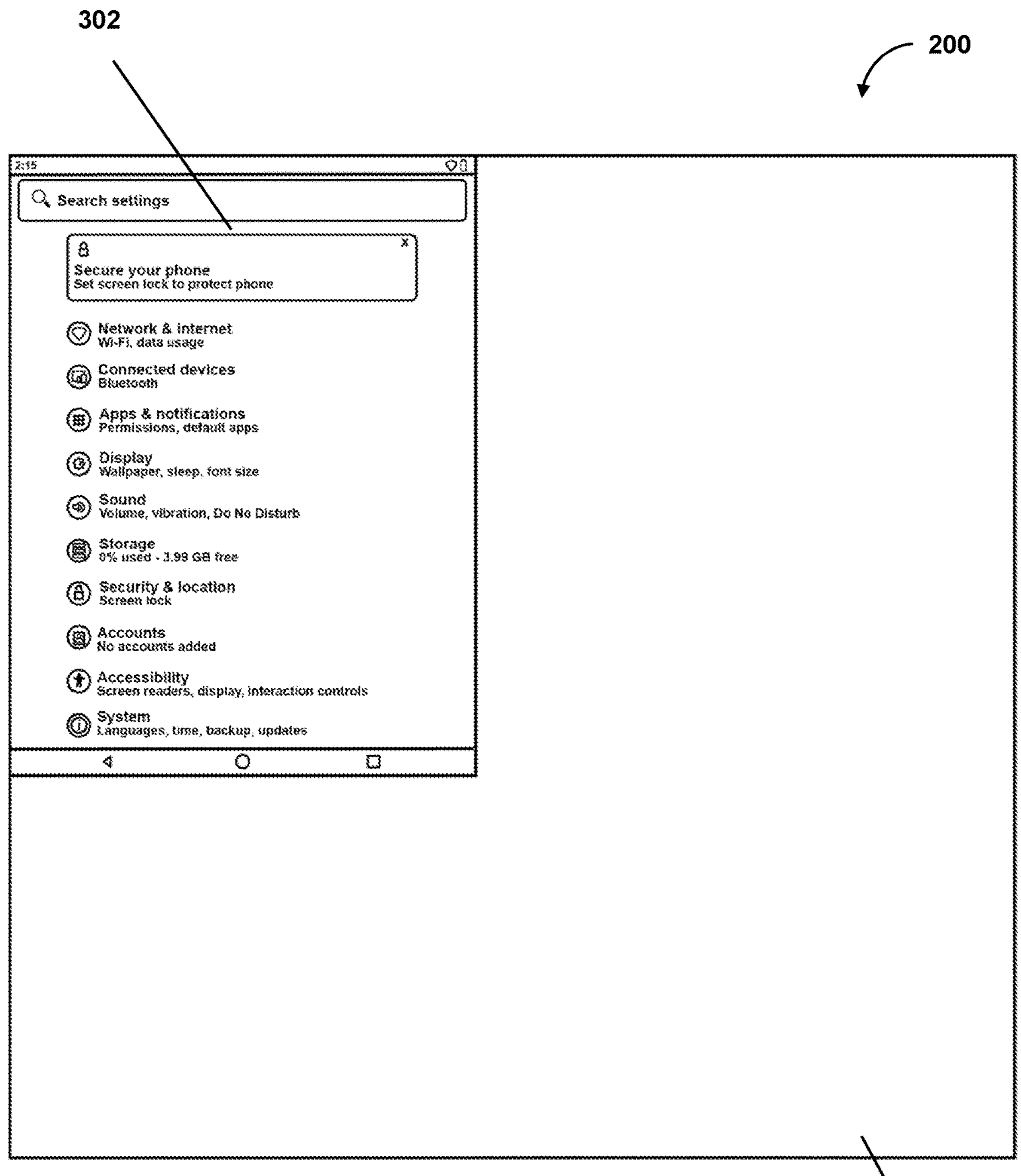
FIG. 3A shows a virtual device user interface, in accordance with one or more embodiments.
Figure 3B:
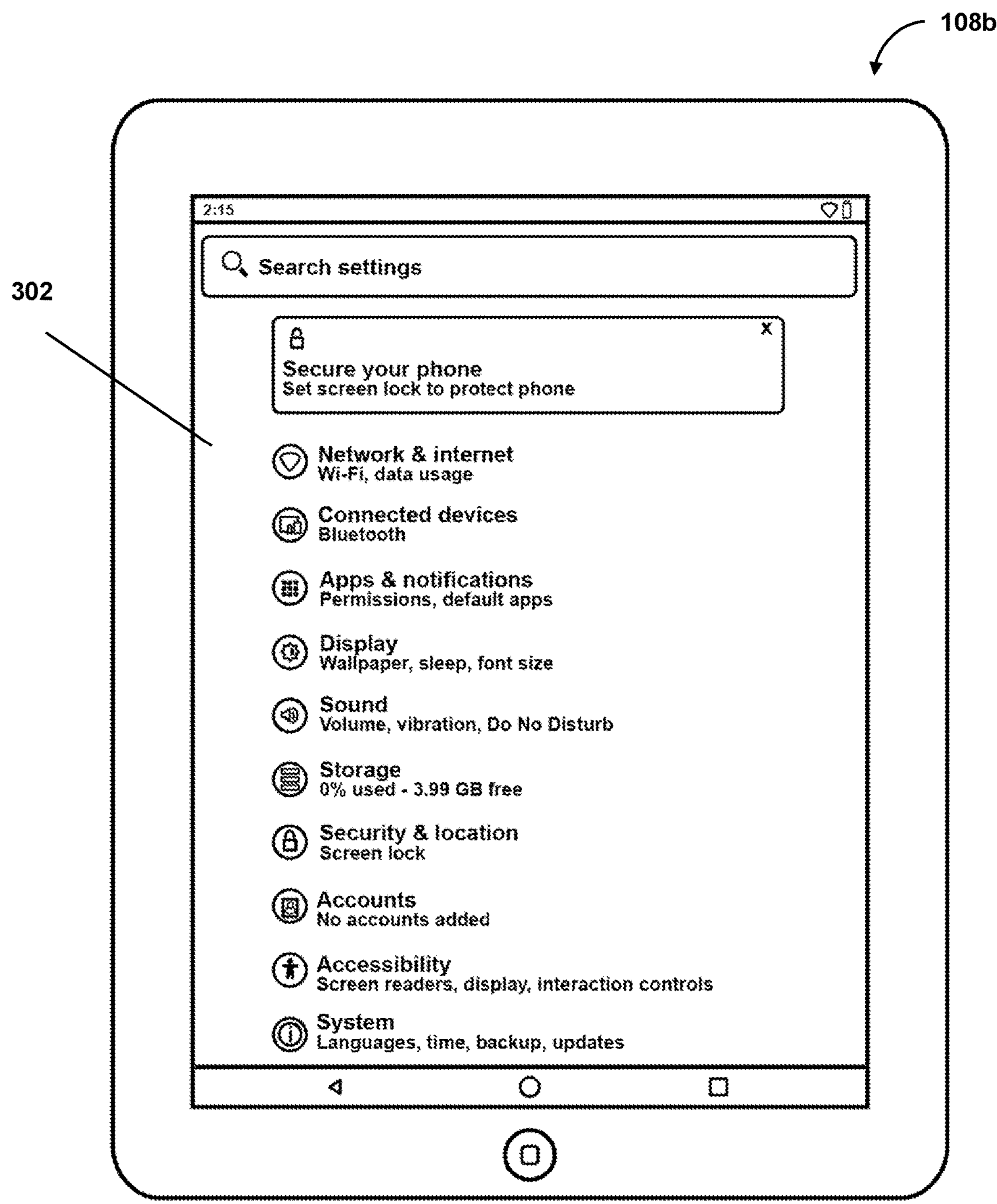
FIG. 3B shows a client device displaying a portion of the virtual device user interface, in accordance with one or more embodiments.

The computer system 102 (e.g., communication subsystem 112) may prepare and send (e.g., stream) the reconfigured first portion 302 of the virtual device UI 200 to the client device 108*b* (see FIG. 3B) without sending the second portion 204 (or without sending other portions of the virtual device UI 200 other than the reconfigured first portion 302) to the client device 108*b*. In response to obtaining the reconfigured first portion 302 of the virtual device UI 200, the client device 108*b* may present the reconfigured first portion 302 of the virtual device UI 200 via a display screen of the client device 108*b* (see FIG. 3B). The reconfigured first portion 302 may be sent as an image or a video (e.g., a stream of h264 encoded video) to the client device 108*b*. As shown in FIGS. 3A and 3B the reconfigured portion 302 is larger than the portion 202 in FIGS. 2A and 2B, and the reconfigured portion 302 includes additional information/content that was missing in the portion 202 in FIGS. 2A and 2B.

In some embodiments, a frame buffer 122 (as illustrated in memory 106 of the computer system 102 in FIG. 1) may store a bitmap corresponding to the virtual device UI 200 (including the reconfigured first portion 302 and the second portion 204). The computer system 102 may generate a frame of display data (e.g., a video signal or an image) based on a portion of the bitmap that corresponds to the reconfigured first portion 302 of the virtual device UI 200, encode the frame of display data, and send the frame of display data to the client device 108*b*. In response to obtaining such frame of display data, the client device 108*b* may present the reconfigured first portion 302 of the virtual device UI 200 via a display screen of the client device 108*b* (see FIG. 2B). The frame of display data may only correspond to the reconfigured first portion 302 and not the second portion 204 (or other portions of the virtual device UI 200 other than the reconfigured first portion 302). For example, the computer system 102 may only encode the reconfigured first portion 302 of the virtual device UI 200 such that only the reconfigured first portion 302 of the virtual device UI 200 is sent to the client device 108*b*. In addition, the computer system 102 may only perform macroblock comparison related to the reconfigured portion 302 during the encoding process. Generating frames of display data, encoding of frames of display data, and performing macroblock comparisons during the encoding process are described in U.S. Pat. No. 10,503,458, which is incorporated herein by reference.

In some embodiments, the first portion 202 (see FIG. 2A) and the reconfigured first portion 302 (see FIG. 3A) may be anchored to the upper left corner of the virtual device UI 200 regardless of the change in client devices 108 that connect to the virtual device 104 or the change in orientation of the client devices 108. Anchoring the first portion 202 or the reconfigured first portion 302 to the upper left corner of the virtual device UI is advantageous because it minimizes memory traversal when the computer system 102 encodes the frame of display data prior to sending the encoded frame to the client device 108. For example, if the first portion 202 or the reconfigured first portion 302 was anchored in a position other than the upper left corner, it would take a lot of memory jumps to get to the first pixel of the first portion 202 or the reconfigured first portion 302 in order to send the first portion 202 or the reconfigured first portion 302 to an encoder for encoding. By anchoring the first portion 202 or the reconfigured first portion 302 to the top left corner of the virtual device UI 200, memory traversal is minimized.

Figure 4A:
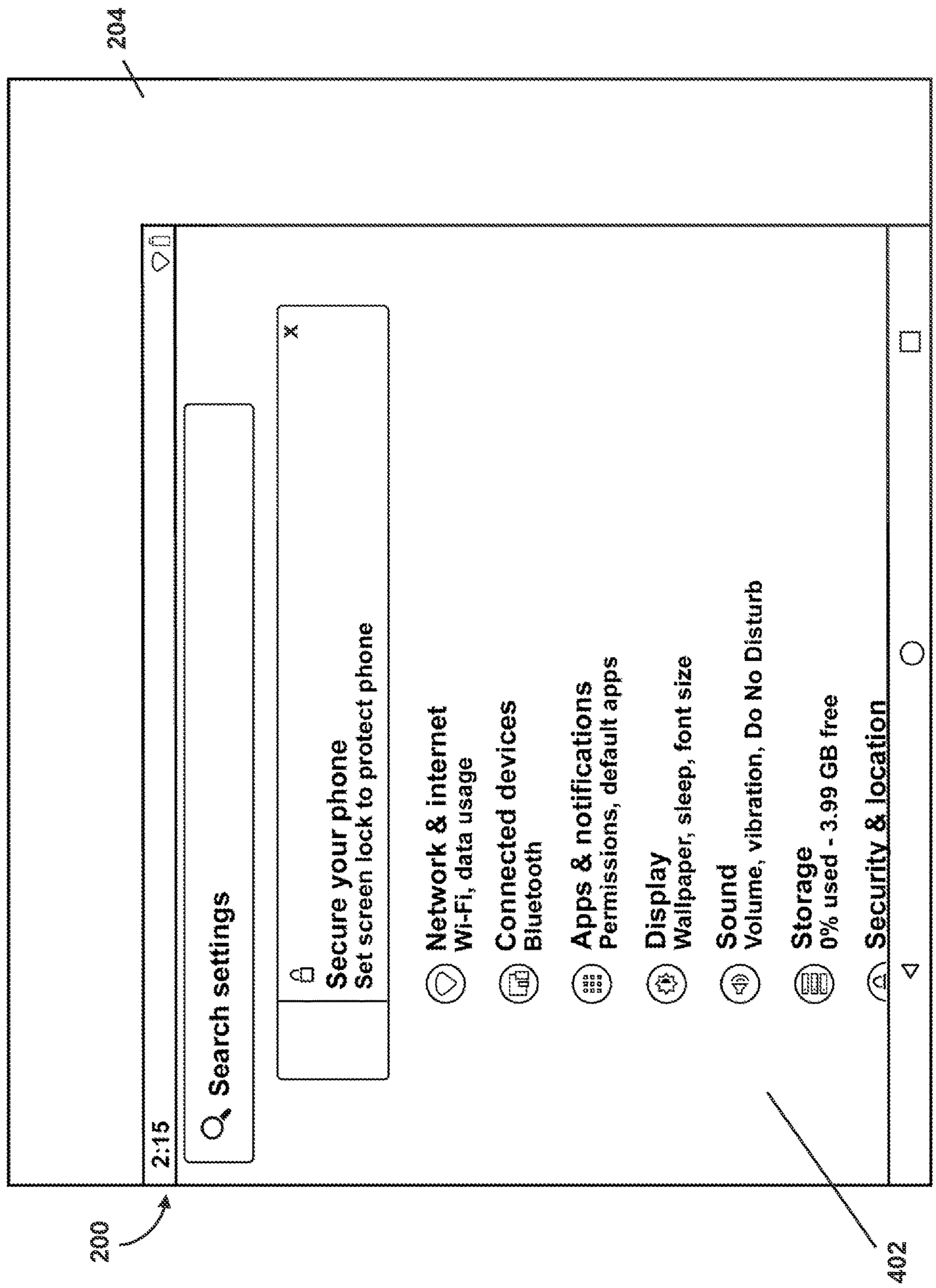
FIG. 4A shows a virtual device user interface, in accordance with one or more embodiments.
Figure 4B:
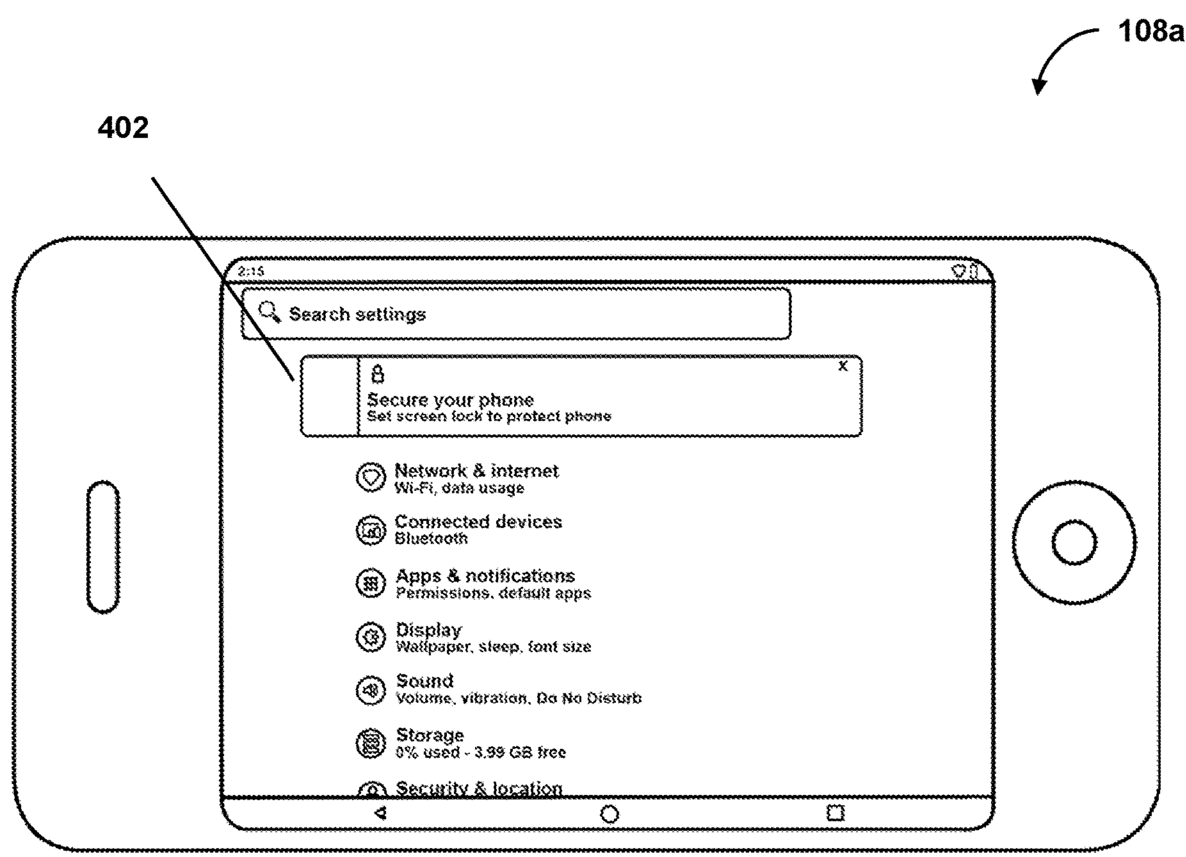
FIG. 4B shows a client device displaying a portion of the virtual device user interface, in accordance with one or more embodiments.
Figure 5A:
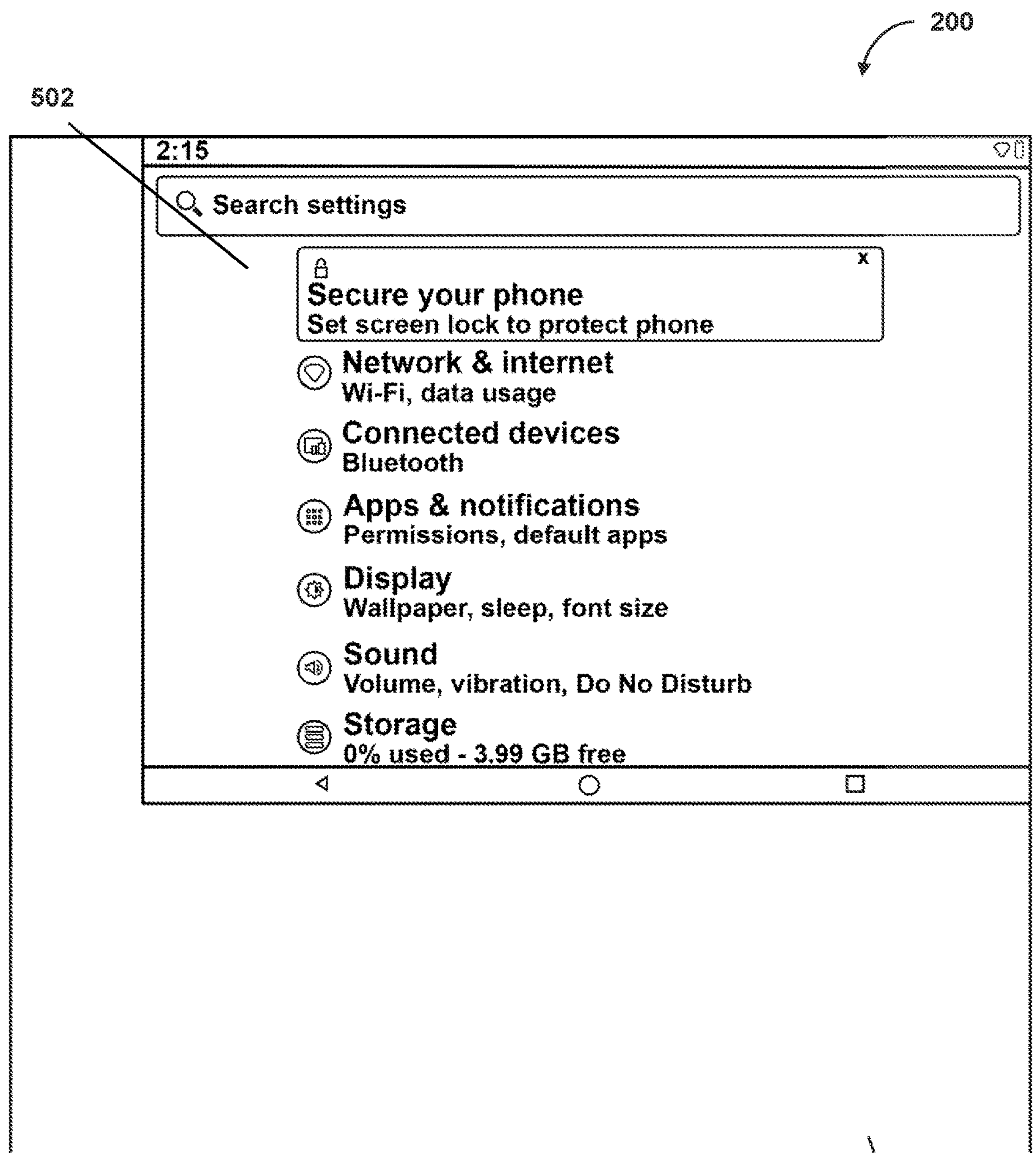
FIG. 5A shows a virtual device user interface, in accordance with one or more embodiments.
Figure 5B:
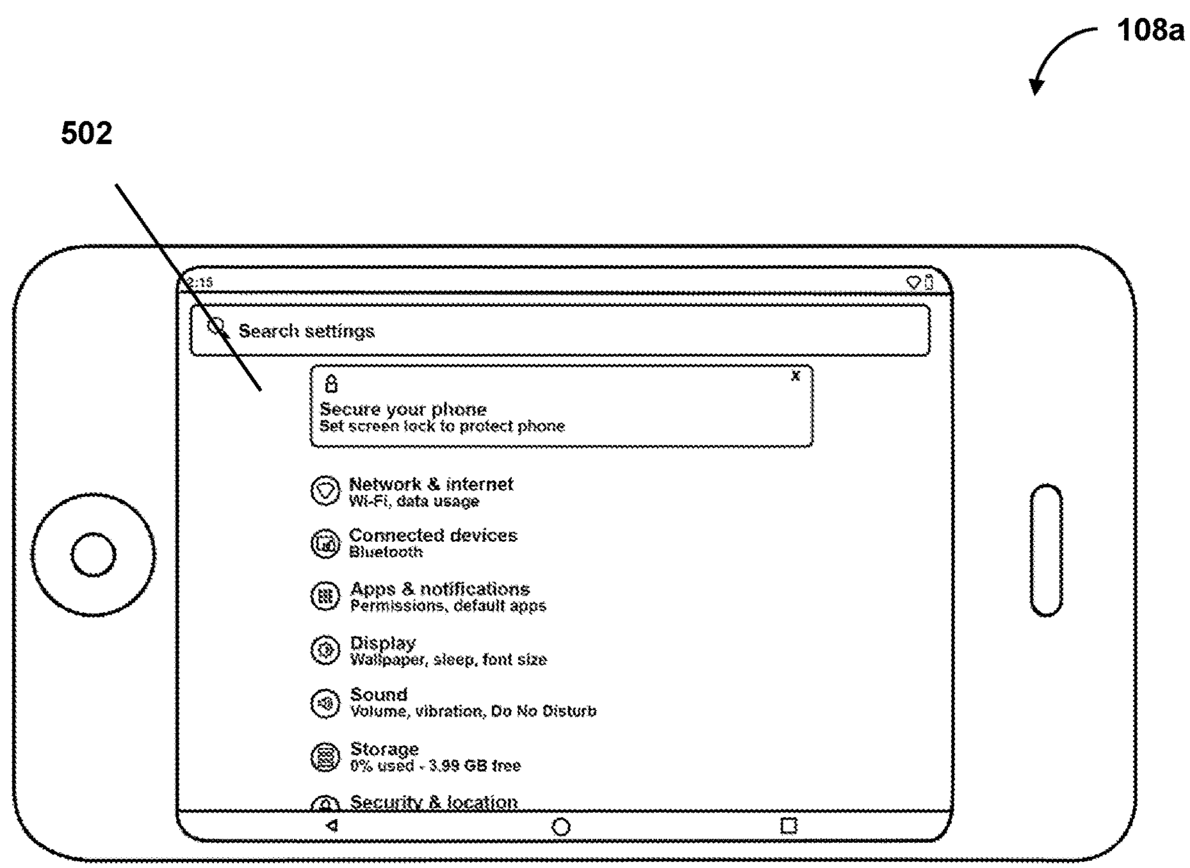
FIG. 5B shows a client device displaying a portion of the virtual device user interface, in accordance with one or more embodiments.
Figure 6A:
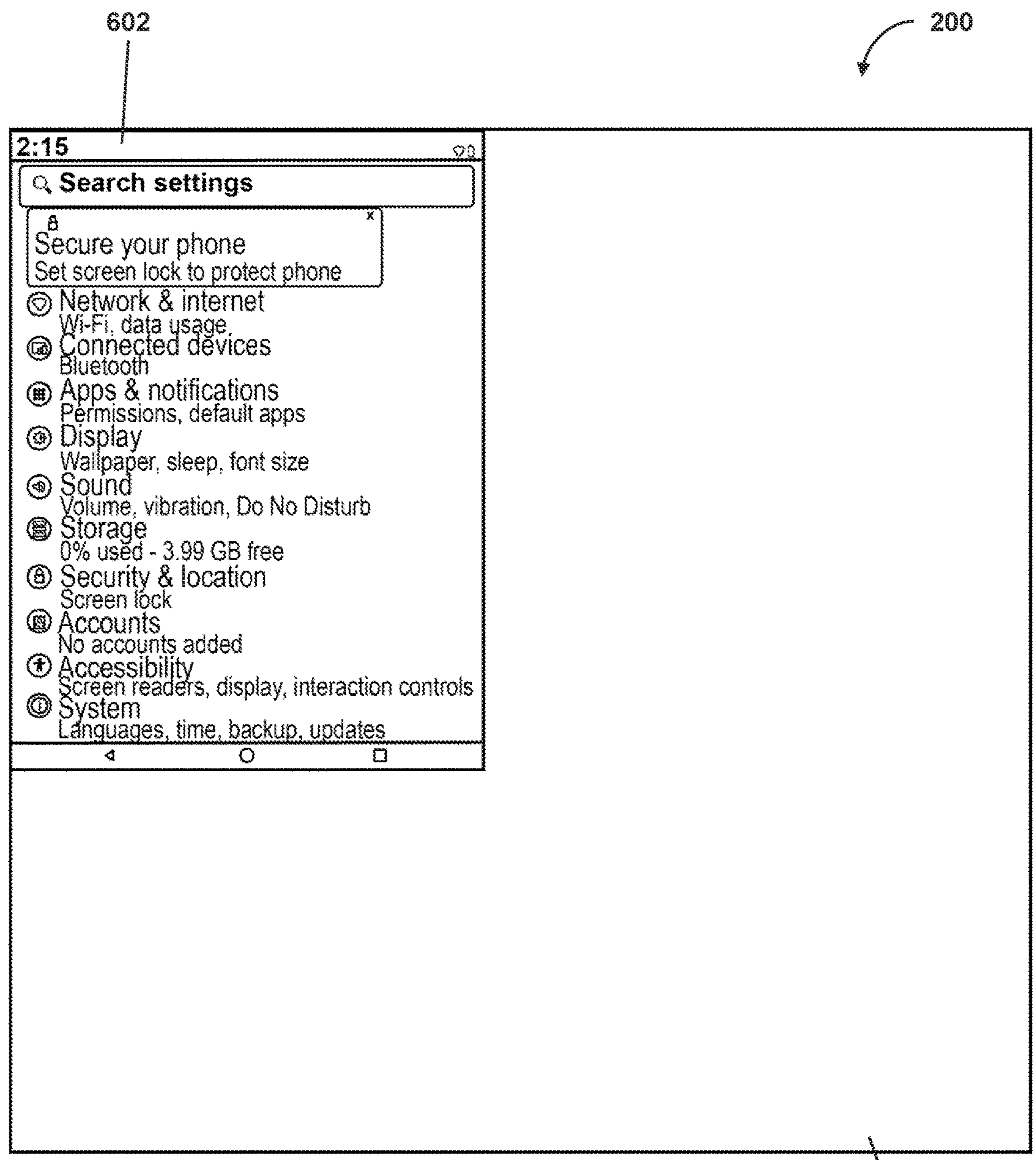
FIG. 6A shows a virtual device user interface, in accordance with one or more embodiments.
Figure 6B:
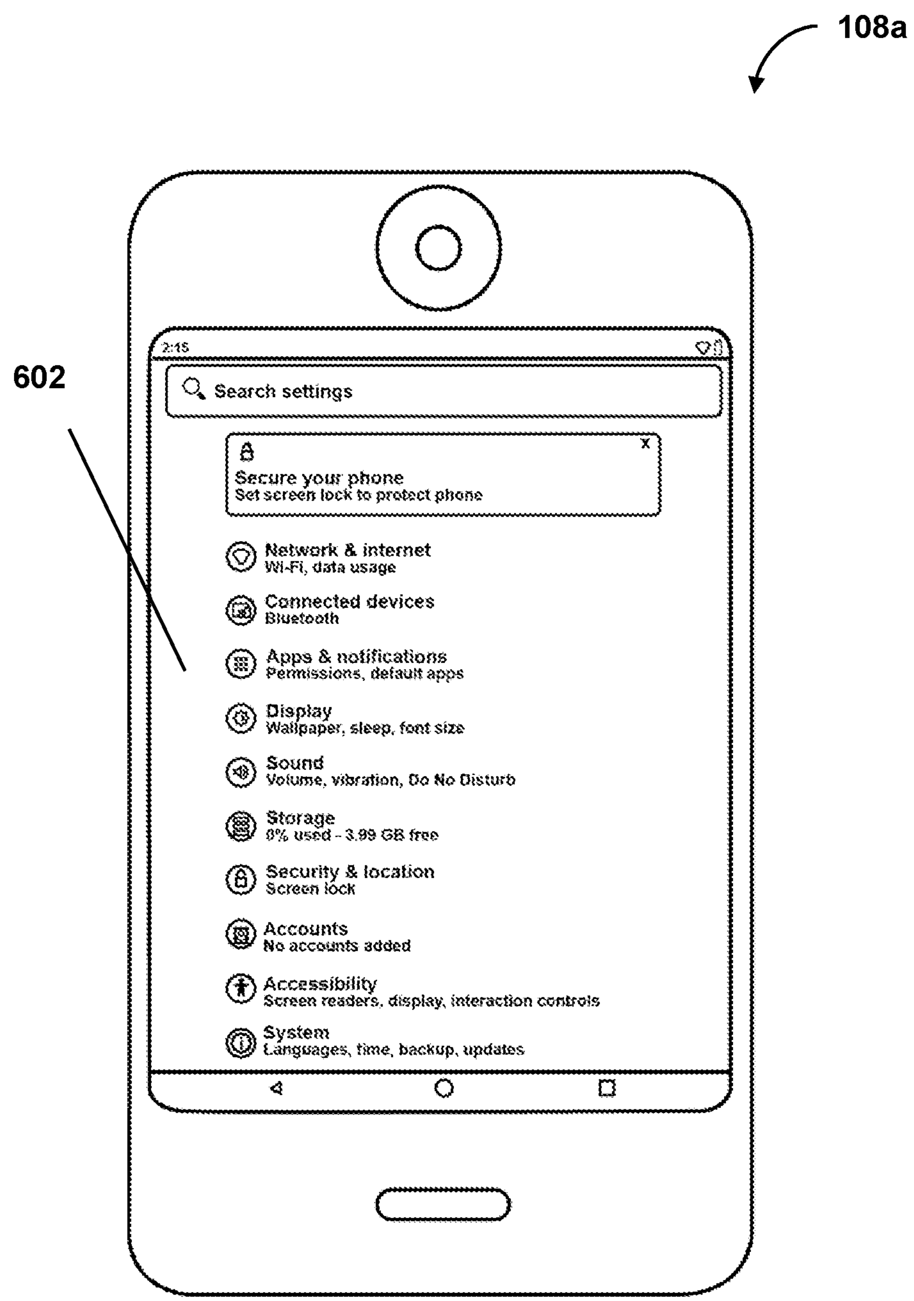
FIG. 6B shows a client device displaying a portion of the virtual device user interface, in accordance with one or more embodiments.

As shown in FIGS. 4A, 5A, and 6A, in some embodiments, the orientation of a portion of the virtual device UI 200 may be changed based on a change in orientation of the client device 108*a*. In response to an orientation change, the client device 108*a* (e.g., orientation determination subsystem 146) may determine its orientation and may send its orientation information to the computer system 102, and the computer system 102 may configure or reconfigure (e.g., change the display resolution, pixel dimension, dimension, aspect ratio, pixel density, or area) the first portion 202 (details of which are explained above) based on the display configuration information corresponding to the client device 108*a* and the computer system 102 (e.g., the orientation determination subsystem 116) may change the orientation (e.g., rotate) of the configured (or reconfigured) first portion 402/502/602 to reflect the change in orientation of the client device 108*a*. It should be understood that the computer system 102 may change the configuration of the first portion 202 first before changing the orientation of the reconfigured first portion 402/502/602 or vice versa. Regarding the orientation, when a client device 108*a* is rotated 90 degree counterclockwise, the computer system 102 may change the orientation such that the configured (or reconfigured) first portion 402/502/602 is rotated clockwise by 90 degrees, and when a client device 108*a* is rotated 90 degree clockwise, the computer system 102 may change the orientation such that the configured (or reconfigured) first portion 402/502/602 is rotated counterclockwise by 90 degrees. For example, the computer system 102 may rotate the configured (or reconfigured) first portion 402/502/602 in a direction opposite to the direction of rotation of the client device 108*a*. As shown in FIG. 4B, the client device 108*a* is rotated counterclockwise by 90 degrees. However, as shown in FIG. 4A, the computer system 102 rotates the configured (or reconfigured) first portion 402 clockwise by 90 degrees. And, as shown in FIG. 5B, the client device 108*a* is rotated clockwise by 90 degrees. However, as shown in FIG. 5A, the computer system 102 rotates the configured (or reconfigured) first portion 502 counterclockwise by 90 degrees. FIG. 6B shows the client device 108*a* being rotated by 180 degrees and, as shown in FIG. 6A, the computer system 102 rotates the configured (or reconfigured) first portion 602 by 180 degrees. Although the first portion 202 of the virtual device UI 200 is reconfigured and reoriented, the second portion 204 of the virtual device UI 200 remains the same and is not reconfigured or reoriented in response to the obtained display configuration information or obtained orientation information corresponding to a client device 108.

The computer system 102 (e.g., communication subsystem 112) may prepare and send (e.g., stream) the reconfigured and reoriented first portion 402/502/602 of the virtual device UI 200 to the client device 108*a* (see FIGS. 4B, 5B, and 6B) without sending the second portion 204 (or without sending other portions of the virtual device UI 200 other than the reconfigured and reoriented first portion 402/502/602) to the client device 108*a*. In response to obtaining the reconfigured and reoriented first portion 402/502/602 of the virtual device UI 200, the client device 108*a* may present the reconfigured and reoriented first portion 402/502/602 of the virtual device UI 200 via a display screen of the client device 108*a* (see FIGS. 4B, 5B, and 6B). The reconfigured and reoriented first portion 402/502/602 may be sent as an image or a video (e.g., a stream of h264 encoded video) to the client device 108*a*. Details regarding presentation of a virtual device UI via a display of a client device 108 in view of orientation changes to the client device 108 are described in U.S. Patent Application Publication No. 2019/0012769, which is incorporated herein by reference.

In response to a touch event detected by the client device 108 (e.g., a touch event associated with a display of the client device 108), the client device 108 (e.g., position determination subsystem 148) may determine X and Y coordinates associated with such a touch event. Since the first portion 202 of the virtual device UI is displayed via the display of the client device 108, the client device 108 (e.g., the position determination subsystem 148) may determine the X and Y coordinates associated with the first portion 202 based on the X and Y coordinates associated with the client device 108. For example, the X coordinate associated with the first portion 202 may be determined based on the following formula: ((X coordinate of the client device 108)/(width of the client device 108))*(width of the first portion 202). Similarly, the Y coordinate associated with the first portion 202 may be determined based on the following formula: ((Y coordinate of the client device 108)/(height of the client device 108))*(height of the first portion 202). Alternatively, the X and Y coordinates associated with the first portion 202 may be similarly determined by the computer system 102 (e.g., position determination subsystem 118). The determined (as described above) X and Y coordinates associated with the first portion 202 may be adjusted by the client device 108 or the computer system 102 based on a change in orientation of the client device 108. For example, (i) in response to a counterclockwise rotation of the client device 108 by 90 degrees, the X coordinate associated with the first portion 202 may be adjusted by taking into account the difference in the width of the second portion 204 (or the width of the entire virtual device UI 200) and the width of the first portion 202, (ii) in response to a clockwise rotation of the client device 108 by 90 degrees, the Y coordinate associated with the first portion 202 may be adjusted by taking into account the difference in the height of the second portion 204 (or the height of the entire virtual device UI 200) and the height of the first portion 202, and (iii) in response to a rotation of the client device 108 by 180 degrees, the Y coordinate associated with the first portion 202 may be adjusted by taking into account the difference in the height of the second portion 204 (or the height of the entire virtual device UI 200) and the height of the first portion 202, and the X coordinate associated with the first portion 202 may be adjusted by taking into account the difference in the width of the second portion 204 (or the width of the entire virtual device UI 200) and the width of the first portion 202. The X and Y coordinates of the first portion 202 may then be mapped to X and Y coordinates of the entire virtual device UI 200 by the computer system 102 or the client device 108. Details regarding processing of touch events by the client device 108 is described in U.S. Pat. No. 9,619,673, which is incorporated herein by reference.

Example Flowcharts

FIGS. 7-10 are example flowcharts of processing operations of methods that enable the various features and functionality of the system as described in detail above. The processing operations of each method presented below are intended to be illustrative and non-limiting. In some embodiments, for example, the methods may be accomplished with one or more additional operations not described, and/or without one or more of the operations discussed. Additionally, the order in which the processing operations of the methods are illustrated (and described below) is not intended to be limiting.

In some embodiments, the methods may be implemented in one or more processing devices (e.g., a digital processor, an analog processor, a digital circuit designed to process information, an analog circuit designed to process information, a state machine, and/or other mechanisms for electronically processing information). The processing devices may include one or more devices executing some or all of the operations of the methods in response to instructions stored electronically on an electronic storage medium. The processing devices may include one or more devices configured through hardware, firmware, and/or software to be specifically designed for execution of one or more of the operations of the methods.

Figure 7:
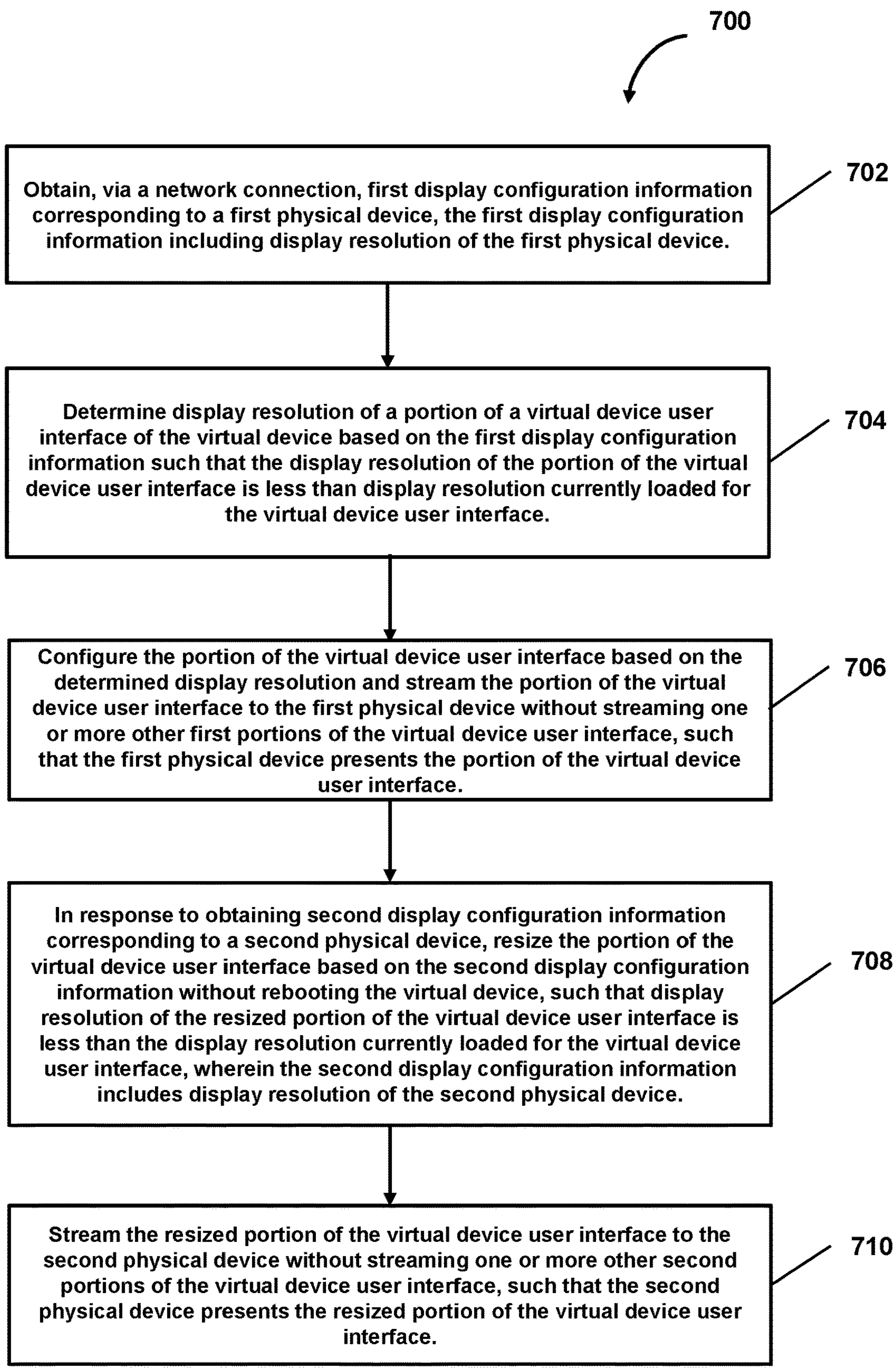
FIG. 7 shows flowchart of a method for facilitating dynamic resizing of a portion of a virtual device user interface based on display configuration information, in accordance with one or more embodiments.

FIG. 7 shows a flowchart of a method 700 for facilitating dynamic resizing of a portion of a virtual device user interface based on display configuration information, in accordance with one or more embodiments. In step 702, a virtual device may obtain first display configuration information corresponding to a first physical device. The first display configuration information may be obtained via a network and the first display configuration information may include a display resolution of the first physical device. The display resolution of the first physical device may correspond to a number of distinct pixels in each dimension that can be displayed via a display of the first physical device. For example, a resolution of 1024×768 means that the width is 1024 pixels and the height (or length) is 768 pixels. In step 704, a display resolution of a portion of a virtual device user interface of the virtual device may be determined based on the obtained first display configuration information. The display resolution of the portion of the virtual device user interface may be less than display resolution currently loaded for the virtual device user interface. Additional details regarding step 704 are described in FIGS. 8 and 9.

In step 706, the portion of the virtual device user interface is configured based on the determined display resolution and streamed to the first physical device. The portion of the virtual device user interface is streamed without streaming one or more other first portions (e.g., one or more other portions of the virtual device user interface other than the portion of the virtual device user interface) of the virtual device user interface such that the first physical device presents the portion of the virtual device user interface. The portion of the virtual device user interface may be sent as an image or a video (e.g., a stream of h264 encoded video) to the physical device.

In step 708, second display configuration information corresponding to a second physical device may be obtained. The second display configuration information may include a display resolution of the second physical device. In this step, in response to obtaining the second display configuration, the portion of the virtual device user interface may be resized based on the second display configuration information without rebooting the virtual device. The display resolution of the resized portion of the virtual device user interface may be less than the display resolution currently loaded for the virtual device user interface. In step 710, the resized portion of the virtual device user interface may be streamed to the second physical device without streaming one or more other second portions (e.g., one or more other portions of the virtual device user interface other than the resized portion) of the virtual device user interface. The resized portion of the virtual device user interface may be streamed to the second physical device such that the second physical device presents the resized portion of the virtual device user interface.

Figure 8:
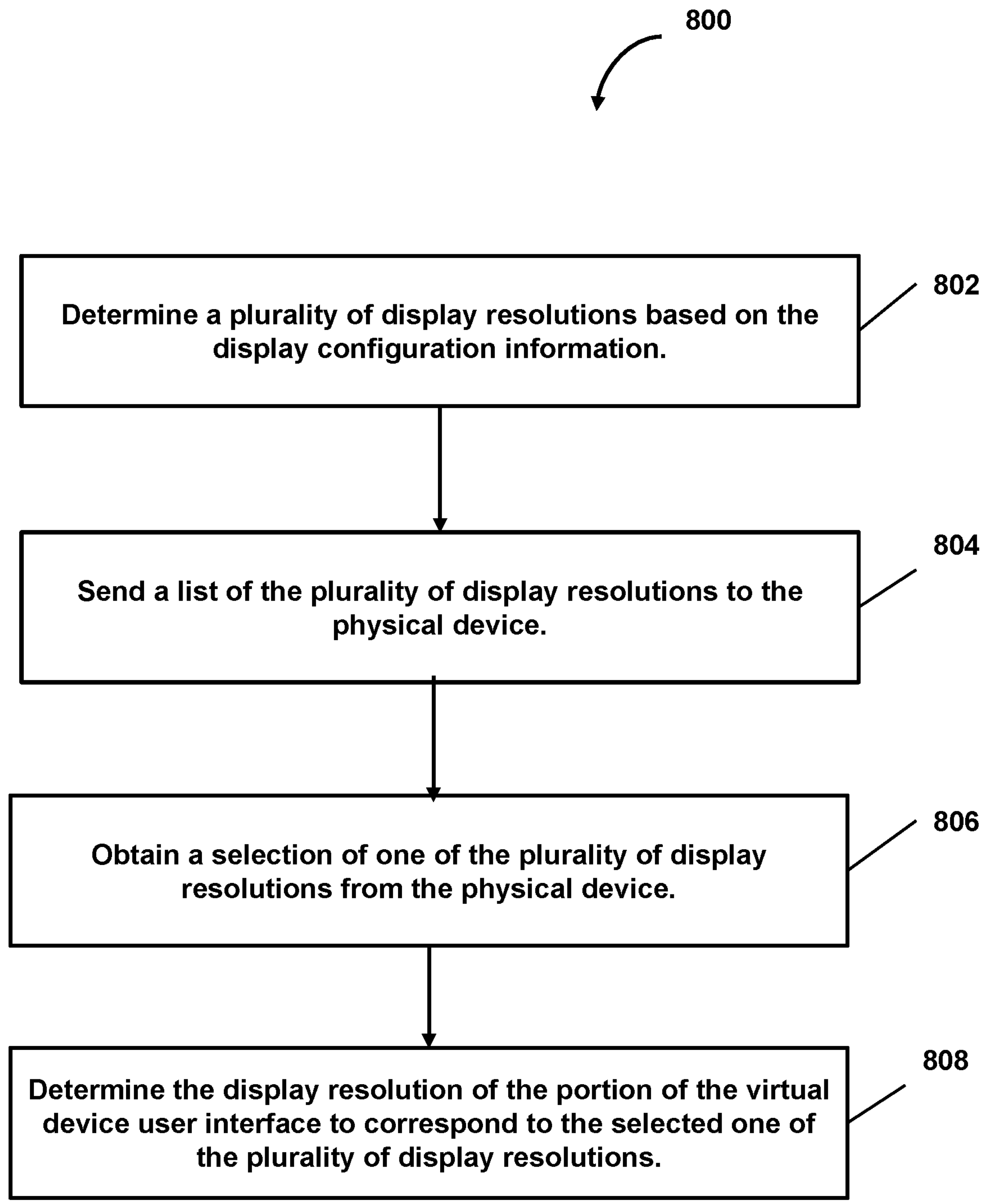
FIG. 8 shows a flowchart of a method for facilitating determining a display resolution of a portion of a virtual device user interface, in accordance with one or more embodiments.

FIG. 8 shows a flowchart of a method 800 for facilitating determining a display resolution of a portion of a virtual device user interface, in accordance with one or more embodiments. In step 802, a plurality of display resolutions (for a portion of a virtual device user interface) may be determined based on obtained display configuration information corresponding to a physical device. The display configuration information may include a display resolution of the physical device. The plurality of display resolutions may correspond to a low resolution (and a low pixel density), a medium resolution (and a medium pixel density), and a high resolution (and a high pixel density) for the portion of the virtual device user interface. In step 804, a list of the plurality of display resolutions may be sent to the physical device and in step 806, a selection of one of the plurality of display resolutions may be obtained from the physical device. In response to obtaining such a selection, in step 808, the display resolution of the portion of the virtual device user interface may be determined to correspond to the selected one of the plurality of display resolutions.

Figure 9:
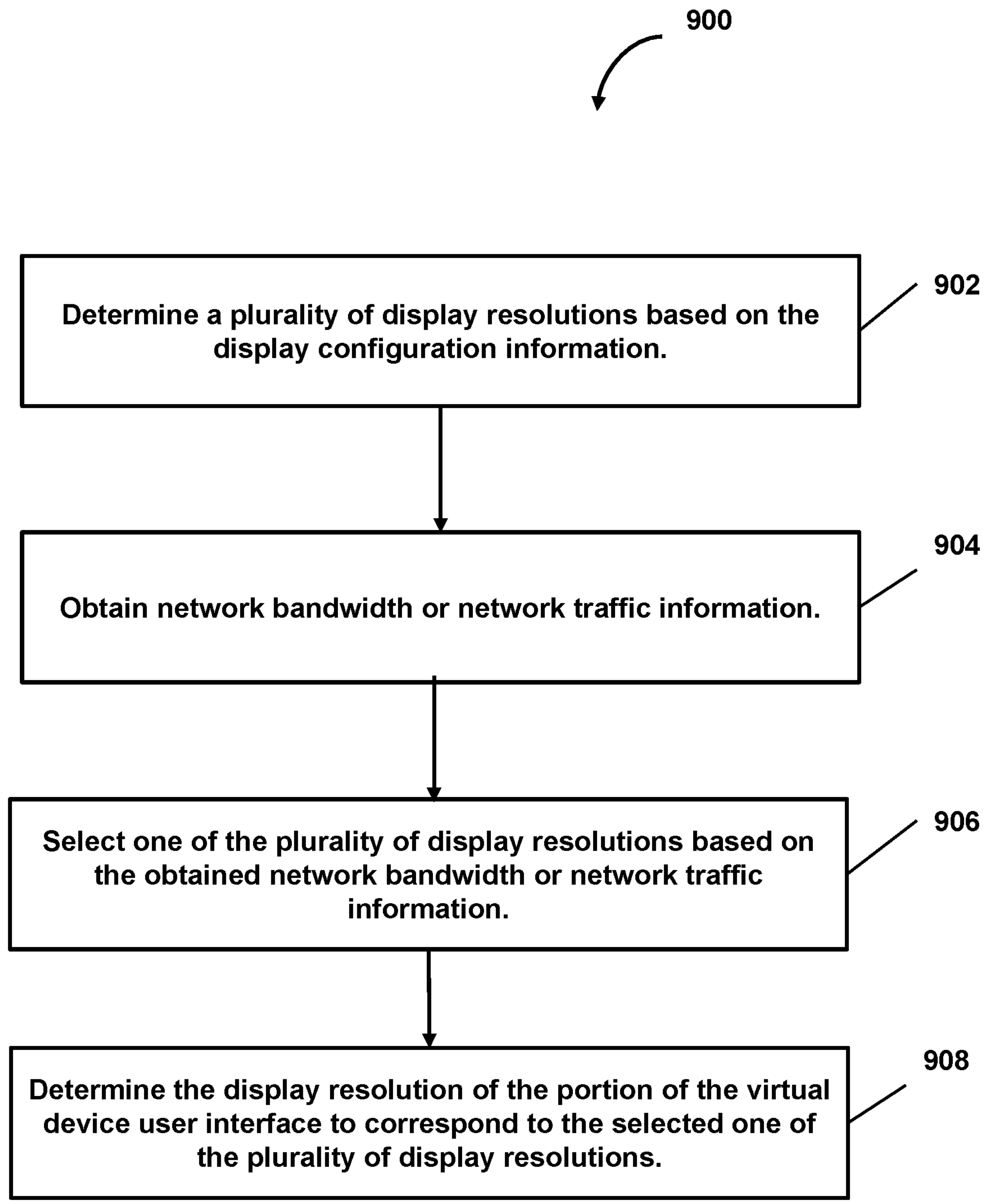
FIG. 9 shows a flowchart of a method for facilitating determining a display resolution of a portion of a virtual device user interface, in accordance with one or more embodiments.

FIG. 9 shows a flowchart of a method 900 for facilitating determining a display resolution of a portion of a virtual device user interface, in accordance with one or more embodiments. In step 902 a plurality of display resolutions (for a portion of a virtual device user interface) may be determined based on obtained display configuration information corresponding to a physical device. The display configuration information may include a display resolution of the physical device. The plurality of display resolutions may correspond to a low resolution (and a low pixel density), a medium resolution (and a medium pixel density), and a high resolution (and a high pixel density) for the portion of the virtual device user interface. In step 904, network bandwidth, network traffic, bandwidth usage information may be obtained, and in step 906, one of the plurality of display resolutions may be selected based on the obtained network bandwidth, network traffic, or bandwidth usage information. For example, a display resolution corresponding to a high resolution (and a high pixel density) for the portion of the virtual device user interface may be selected in response to a high network bandwidth (or low network traffic or low bandwidth usage), a display resolution corresponding to a low resolution (and low pixel density) for the portion of the virtual device user interface may be selected in response to a low network bandwidth (or high network traffic or high bandwidth usage), or a display resolution corresponding to a medium resolution (and medium pixel density) for the portion of the virtual device user interface may be selected in response to a medium network bandwidth (or medium network traffic or medium bandwidth usage). In response to obtaining such a selection, in step 908, the display resolution of the portion of the virtual device user interface may be determined to correspond to the selected one of the plurality of display resolutions.

Figure 10:
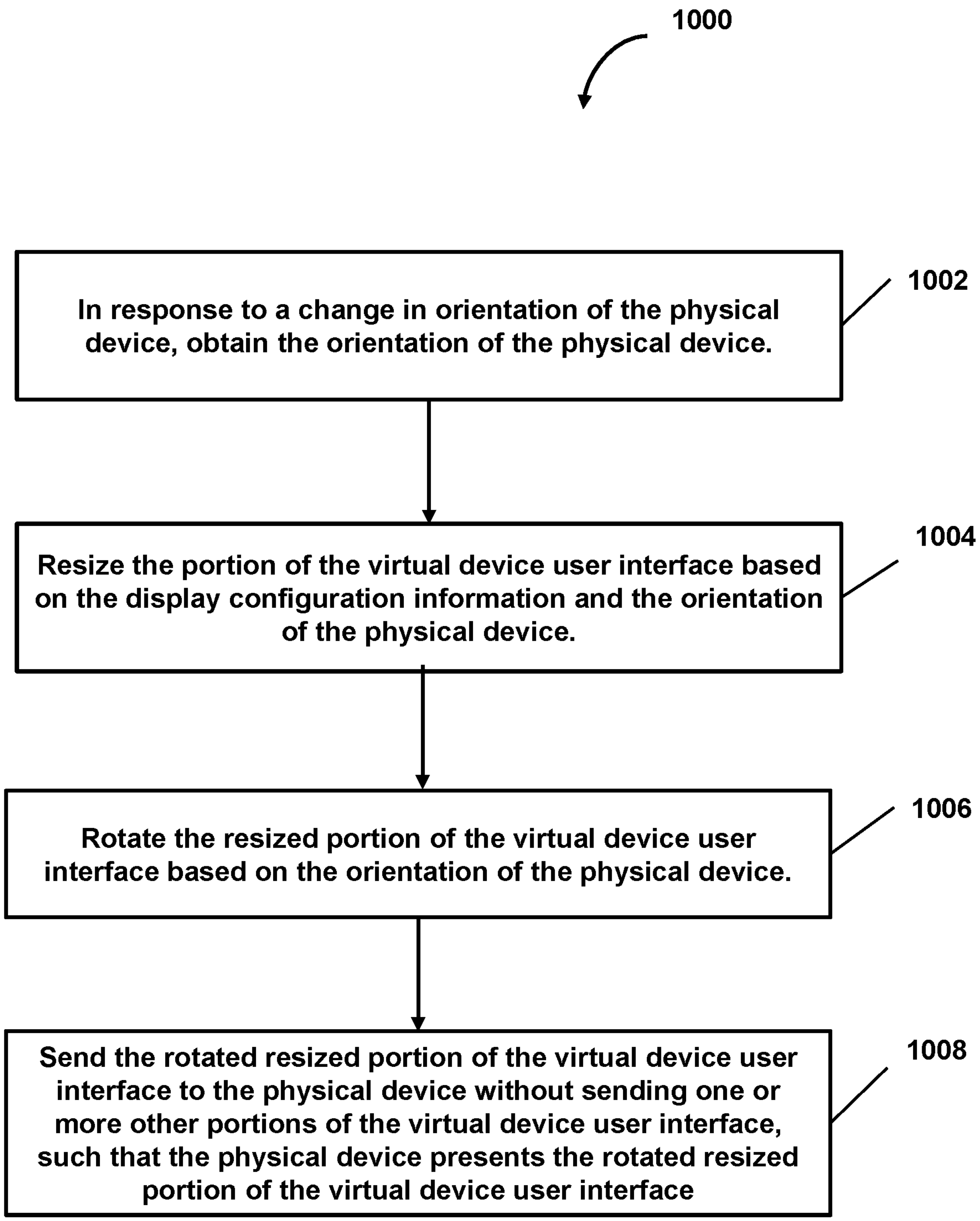
FIG. 10 shows a flowchart of a method for facilitating rotation of a portion of a virtual device user interface, in accordance with one or more embodiments.

FIG. 10 shows a flowchart of a method 1000 for facilitating rotation of a portion of a virtual device user interface, in accordance with one or more embodiments. In step 1002, an orientation of a physical device may be obtained. The orientation of the physical device may be obtained in response to a change in orientation of the physical device. In step 1004, the portion of the virtual device user interface may be resized based on the display configuration information corresponding to the physical device and the orientation information corresponding to the physical device. The display configuration information may include a display resolution of the physical device. In step 1006, the resized portion of the virtual device user interface may be rotated based on the orientation of the physical device. Alternatively, in step 1004, the portion of the virtual device user interface may be rotated based on the orientation of the physical device and in step 1006, the rotated portion of the virtual device user interface may be resized based on the display configuration information corresponding to the physical device and the orientation information corresponding to the physical device. In step 1008, the rotated resized portion of the virtual device user interface may be sent to the physical device without sending one or more other portions of the virtual device user interface (e.g., without sending one or more portions of the virtual device user interface other than the portion of the virtual device user interface). The physical device may present the rotated resized portion of the virtual device user interface via a display of the physical device.

In some embodiments, the various computers and subsystems illustrated in FIG. 1 may include one or more computing devices that are programmed to perform the functions described herein. The computing devices may include one or more electronic storages (e.g., memory 106, database(s) 132, or other electronic storages), one or more physical processors programmed with one or more computer program instructions, circuitry, and/or other components. The computing devices may include communication lines or ports to enable the exchange of information within a network (e.g., network 152) or other computing platforms via wired or wireless techniques (e.g., Ethernet, fiber optics, coaxial cable, Wi-Fi, Bluetooth, near field communication, or other technologies). The computing devices may include a plurality of hardware, software, and/or firmware components operating together. For example, the computing devices may be implemented by a cloud of computing platforms operating together as the computing devices.

The electronic storages may include non-transitory storage media that electronically stores information. The storage media of the electronic storages may include one or both of (i) system storage that is provided integrally (e.g., substantially non-removable) with servers or client devices or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storage may store software algorithms, information determined by the processors, information obtained from servers, information obtained from client devices, or other information that enables the functionality as described herein.

The processors may be programmed to provide information processing capabilities in the computing devices. As such, the processors may include one or more of a digital processor, an analog processor, a digital circuit designed to process information, an analog circuit designed to process information, a state machine, and/or other mechanisms for electronically processing information. In some embodiments, the processors may include a plurality of processing units. These processing units may be physically located within the same device, or the processors may represent processing functionality of a plurality of devices operating in coordination. The processors may be programmed to execute computer program instructions to perform functions described herein of subsystems 112-120,142-150, or other subsystems. The processors may be programmed to execute computer program instructions by software; hardware; firmware; some combination of software, hardware, or firmware; and/or other mechanisms for configuring processing capabilities on the processors.

It should be appreciated that the description of the functionality provided by the different subsystems 112-120 and 142-150 described herein is for illustrative purposes, and is not intended to be limiting, as any of subsystems 112-120 and 142-150 may provide more or less functionality than is described. For example, one or more of subsystems 112-120 and 142-150 may be eliminated, and some or all of its functionality may be provided by other ones of subsystems 112-120 and 142-150. As another example, additional subsystems may be programmed to perform some or all of the functionality attributed herein to one of subsystems 112-120 and 142-150.

Although the present disclosure has been described in detail for the purpose of illustration based on what is currently considered to be the most practical and preferred embodiments, it is to be understood that such detail is solely for that purpose and that the disclosure is not limited to the disclosed embodiments, but, on the contrary, is intended to cover modifications and equivalent arrangements that are within the scope of the appended claims. For example, it is to be understood that the present disclosure contemplates that, to the extent possible, one or more features of any embodiment can be combined with one or more features of any other embodiment.

The present techniques will be better understood with reference to the following enumerated embodiments:

1. A method comprising: obtaining display configuration information corresponding to a physical device; determining a display configuration of a portion of a virtual device user interface of a virtual device based on the display configuration information; configuring the portion of the virtual device user interface based on the determined display configuration of the portion of the virtual device user interface; and sending (or streaming) the portion of the virtual device user interface to the physical device (e.g., without sending one or more other portions of the virtual device user interface) such that the physical device presents the portion of the virtual device user interface.
2. The method according to embodiment 1, wherein the display configuration information is obtained via a network connection.
3. The method according to any of the preceding embodiments,wherein the display configuration of the portion of the virtual device user interface includes a display resolution of the portion of the virtual device user interface.
4. The method according to embodiment 3, wherein the display resolution of the portion of the virtual device user interface is less than a display resolution currently loaded for the virtual device user interface.
5. The method according to any of the preceding embodiments, further comprising: in response to obtaining second display configuration information, resizing the portion of the virtual device user interface based on the second display configuration information, such that a display resolution of the resized portion of the virtual device user interface is less than display resolution currently loaded for the virtual device user interface; and sending the resized portion of the virtual device user interface to the second physical device (e.g., without sending one or more other second portions of the virtual device user interface) such that the second physical device presents the resized portion of the virtual device user interface.
6. The method according to any of the preceding embodiments, further comprising: obtaining the second display configuration information in response to a disconnection of the physical device from the virtual device and a connection of the second physical device to the virtual device.
7. The method according to any of the preceding embodiments, wherein determining the display configuration of the portion of the virtual device user interface includes: determining a plurality of display resolutions based on the display configuration information; sending a list of the plurality of display resolutions to the physical device; obtaining a selection of one of the plurality of display resolutions from the physical device; and determining the display configuration of the portion of the virtual device user interface to correspond to the selected one of the plurality of display resolutions.
8. The method according to any of the preceding embodiments, wherein determining the display configuration of the portion of the virtual device user interface includes: determining a plurality of display configuration based on the display configuration information; obtaining network bandwidth or network traffic information; selecting one of the plurality of display resolutions based on the obtained network bandwidth or network traffic information; and determining the display configuration of the portion of the virtual device user interface to correspond to the selected one of the plurality of display resolutions.
9. The method according to any of the preceding embodiments, further comprising: generating a video signal based on a portion of a bitmap, wherein the bitmap corresponds to the virtual device user interface and the portion of the bitmap corresponds to the portion of the virtual device user interface; and sending the portion of the virtual device user interface as the video signal to the physical device.
10. The method according to any of the preceding embodiments, in response to a change in orientation of the physical device, obtaining the orientation of the physical device; resizing the portion of the virtual device user interface based on the display configuration information and the orientation of the physical device; rotating the resized portion of the virtual device user interface based on the orientation of the physical device; and sending the rotated resized portion of the virtual device user interface to the physical device (e.g., without sending one or more other second portions of the virtual device user interface) such that the physical device presents the rotated resized portion of the virtual device user interface.

11. The method according to any of the preceding embodiments, wherein the display configuration information includes a display resolution corresponding to the physical device or a display resolution corresponding to an application running on the physical device.

12. The method according to any of the preceding embodiments, wherein the display configuration information includes pixel density corresponding to the physical device, and wherein a pixel density of the portion of the virtual device user interface is determined further based on the pixel density corresponding to the physical device.
13. A system, comprising: one or more processors; and memory storing instructions that when executed by the processors cause the processors to effectuate operations comprising those of any of embodiments 1-12.
14. A tangible, non-transitory, machine-readable medium storing instructions that when executed by a data processing apparatus cause the data processing apparatus to perform operations comprising those of any of embodiments 1-12.

What is claimed is:

1. A system for facilitating no-device-reboot dynamic resizing of a portion of a virtual device user interface based on display configuration information corresponding to a physical device, the system comprising:

a virtual device platform including a virtual device, the virtual device platform including circuitry configured to:

obtain, via a network connection, first display configuration information associated with a first physical device, the first display configuration information including a display resolution of the first physical device;

determine a display resolution of a portion of a virtual device user interface of the virtual device based on the first display configuration information such that the display resolution of the portion of the virtual device user interface is less than display resolution currently loaded for the virtual device user interface;

configure the portion of the virtual device user interface based on the determined display resolution of the portion of the virtual device user interface;

stream the portion of the virtual device user interface to the first physical device without streaming one or more other first portions of the virtual device user interface, such that the first physical device presents the portion of the virtual device user interface;

in response to obtaining second display configuration information associated with a second physical device, resize the portion of the virtual device user interface based on the second display configuration information without rebooting the virtual device, such that display resolution of the resized portion of the virtual device user interface is less than the display resolution currently loaded for the virtual device user interface, wherein the second display configuration information includes a display resolution of the second physical device; and stream the resized portion of the virtual device user interface to the second physical device without streaming one or more other second portions of the virtual device user interface, such that the second physical device presents the resized portion of the virtual device user interface.

2. The system of claim 1, wherein determining the display resolution of the portion of the virtual device user interface includes:

determining a plurality of display resolutions based on the first display configuration information;

sending a list of the plurality of display resolutions to the first physical device; obtaining a selection of one of the plurality of display resolutions from the first physical device; and determining the display resolution of the portion of the virtual device user interface to correspond to the selected one of the plurality of display resolutions.

3. The system of claim 1, wherein determining the display resolution of the portion of the virtual device user interface includes:

determining a plurality of display resolutions based on the first display configuration information;

obtaining network bandwidth or network traffic information;

selecting one of the plurality of display resolutions based on the obtained network bandwidth or network traffic information; and determining the display resolution of the portion of the virtual device user interface to correspond to the selected one of the plurality of display resolutions.

4. The system of claim 1, wherein the virtual device platform further includes a frame buffer that stores a bitmap corresponding the virtual device user interface, and wherein the circuitry is configured to:

generate a first video signal based on a portion of the bitmap that corresponds to the portion of the virtual device user interface; and send the portion of the virtual device user interface as the first video signal to the first physical device.

5. The system of claim 1, wherein the circuitry is configured to obtain the second display configuration information in response to a disconnection of the first physical device from the virtual device and a connection of the second physical device to the virtual device.

6. A method comprising:

obtaining display configuration information associated with a physical device, the display configuration information including a display resolution of the physical device;

determining a display resolution of a portion of a virtual device user interface of a virtual device based on the display configuration information;

configuring the portion of the virtual device user interface based on the determined display resolution of the portion of the virtual device user interface;

sending the portion of the virtual device user interface to the physical device without sending one or more other portions of the virtual device user interface, such that the physical device presents the portion of the virtual device user interface; and in response to obtaining second display configuration information associated with a second physical device, resizing the portion of the virtual device user interface based on the second display configuration information without rebooting the virtual device, such that display resolution of the resized portion of the virtual device user interface is less than display resolution currently loaded for the virtual device user interface; and sending the resized portion of the virtual device user interface to the second physical device without sending one or more other second portions of the virtual device user interface, such that the second physical device presents the resized portion of the virtual device user interface.

7. The method of claim 6, further comprising: obtaining the second display configuration information in response to a disconnection of the physical device from the virtual device and a connection of the second physical device to the virtual device.

8. The method of claim 6, wherein determining the display resolution of the portion of the virtual device user interface includes:

determining a plurality of display resolutions based on the display configuration information;

sending a list of the plurality of display resolutions to the physical device;

obtaining a selection of one of the plurality of display resolutions from the physical device; and determining the display resolution of the portion of the virtual device user interface to correspond to the selected one of the plurality of display resolutions.

9. The method of claim 6, wherein determining the display resolution of the portion of the virtual device user interface includes:

determining a plurality of display resolutions based on the display configuration information;

obtaining network bandwidth or network traffic information;

selecting one of the plurality of display resolutions based on the obtained network bandwidth or network traffic information; and determining the display resolution of the portion of the virtual device user interface to correspond to the selected one of the plurality of display resolutions.

10. The method of claim 6, further comprising:

generating a video signal based on a portion of a bitmap, wherein the bitmap corresponds to the virtual device user interface and the portion of the bitmap corresponds to the portion of the virtual device user interface; and sending the portion of the virtual device user interface as the video signal to the physical device.

11. The method of claim 6, further comprising:

in response to a change in orientation of the physical device, obtaining the orientation of the physical device;

resizing the portion of the virtual device user interface based on the display configuration information and the orientation of the physical device;

rotating the resized portion of the virtual device user interface based on the orientation of the physical device; and sending the rotated resized portion of the virtual device user interface to the physical device without sending one or more other second portions of the virtual device user interface, such that the physical device presents the rotated resized portion of the virtual device user interface.

12. The method of claim 6, wherein the display configuration information further includes pixel density corresponding to the physical device, and wherein a pixel density of the portion of the virtual device user interface is determined further based on the pixel density corresponding to the physical device.

13. One or more non-transitory, computer-readable media storing instructions that, when executed by one or more processors, effectuate operations comprising:

obtaining display configuration information associated with a physical device;

determining a display resolution of a portion of a virtual device user interface of a virtual device based on the display configuration information;

configuring the portion of the virtual device user interface based on the determined display resolution of the portion of the virtual device user interface; and sending the portion of the virtual device user interface to the physical device without sending one or more other portions of the virtual device user interface, such that the physical device presents the portion of the virtual device user interface; and in response to obtaining second display configuration information, resizing the portion of the virtual device user interface based on the second display configuration information without rebooting the virtual device, such that display resolution of the resized portion of the virtual device user interface is less than display resolution currently loaded the virtual device user interface; and sending the resized portion of the virtual device user interface to the second physical device without sending one or more other second portions of the virtual device user interface, such that the second physical device presents the resized portion of the virtual device user interface.

14. The non-transitory, computer-readable media of claim 13, wherein the display configuration information includes a display resolution of the physical device or a display resolution of a first client application running on the physical device, and wherein the second display configuration information includes a display resolution of a second physical device or a display resolution of a second client application running on the second physical device.

15. The non-transitory, computer-readable media of claim 13, wherein determining the display resolution of the portion of the virtual device user interface includes:

determining a plurality of display resolutions based on the display configuration information;

sending a list of the plurality of display resolutions to the physical device;

obtaining a selection of one of the plurality of display resolutions from the physical device; and determining the display resolution of the portion of the virtual device user interface to correspond to the selected one of the plurality of display resolutions.

16. The non-transitory, computer-readable media of claim 13, wherein determining the display resolution of the portion of the virtual device user interface includes:

determining a plurality of display resolutions based on the display configuration information;

obtaining network bandwidth or network traffic information;

selecting one of the plurality of display resolutions based on the obtained network bandwidth or network traffic information; and determining the display resolution of the portion of the virtual device user interface to correspond to the selected one of the plurality of display resolutions.

17. The non-transitory, computer-readable media of claim 13, further comprising: generating a video signal based on a portion of a bitmap, wherein the bitmap corresponds to the virtual device user interface and the portion of the bitmap corresponds to the portion of the virtual device user interface; and sending the portion of the virtual device user interface as the video signal to the physical device.

18. The non-transitory, computer-readable media of claim 13, further comprising:

in response to a change in orientation of the physical device, obtaining the orientation of the physical device;

resizing the portion of the virtual device user interface based on the display configuration information and the orientation of the physical device;

rotating the resized portion of the virtual device user interface based on the orientation of the physical device; and sending the rotated resized portion of the virtual device user interface to the physical device without sending one or more other second portions of the virtual device user interface, such that the physical device presents the rotated resized portion of the virtual device user interface.

* * * * *